(12) United States Patent
Appelbaum et al.

(10) Patent No.: US 12,327,004 B2
(45) Date of Patent: Jun. 10, 2025

(54) REAL-TIME GEOSPATIAL COLLABORATION SYSTEM

(71) Applicant: Immersive Wisdom, Inc., Boca Raton, FL (US)

(72) Inventors: Michael S. Appelbaum, Highland Beach, FL (US); Fred Denver Coulson, III, Parks Hill, KY (US); Marshall Miller, Cincinnati, OH (US)

(73) Assignee: Immersive Wisdom, Inc., Boca Raton, FL (US)

( * ) Notice: Subject to any disclaimer, the term of this patent is extended or adjusted under 35 U.S.C. 154(b) by 0 days.

(21) Appl. No.: 18/636,362

(22) Filed: Apr. 16, 2024

(65) Prior Publication Data

US 2025/0060857 A1     Feb. 20, 2025

Related U.S. Application Data

(63) Continuation of application No. 18/067,764, filed on Dec. 19, 2022, now Pat. No. 11,989,386, which is a continuation of application No. 17/839,584, filed on Jun. 14, 2022, now Pat. No. 11,561,670, which is a continuation of application No. 17/411,910, filed on Aug. 25, 2021, now Pat. No. 11,392,263.
(Continued)

(51) Int. Cl.
| | |
|---|---|
| *H04L 65/1069* | (2022.01) |
| *G06F 3/01* | (2006.01) |
| *G06F 3/04815* | (2022.01) |
| *G06F 3/14* | (2006.01) |
| *H04L 65/60* | (2022.01) |

(52) U.S. Cl.
CPC .......... *G06F 3/04815* (2013.01); *G06F 3/011* (2013.01); *G06F 3/1454* (2013.01); *H04L 65/1069* (2013.01); *H04L 65/60* (2013.01)

(58) Field of Classification Search
CPC .... G06F 3/04815; G06F 3/011; G06F 3/1454; H04L 65/1069; H04L 65/60
USPC ...................................................... 709/227
See application file for complete search history.

(56) References Cited

U.S. PATENT DOCUMENTS

| | | | | |
|---|---|---|---|---|
| 6,151,028 A | * | 11/2000 | Kumagai | ............... G06T 15/00 |
| | | | | 345/426 |
| 8,965,430 B2 | | 2/2015 | Landstrom et al. | |
| | | (Continued) | | |

FOREIGN PATENT DOCUMENTS

| | | | | |
|---|---|---|---|---|
| CA | 3021079 A1 | * | 10/2017 | ........... G02B 27/017 |
| CA | 2997789 C | * | 10/2022 | ............. G06F 1/163 |

OTHER PUBLICATIONS

International Search Report and Written Opinion mailed Nov. 23, 2021 in International Application PCT/US2021/047581.
(Continued)

*Primary Examiner* — Glenford J Madamba
(74) *Attorney, Agent, or Firm* — Polsinelli LLP

(57) ABSTRACT

Systems and methods are provided for generating virtual three-dimensional environments that allow for simultaneous and collaborate interaction amongst users that utilize virtual reality systems, augmented reality systems, and standard desktop systems. As users interact with elements presented within these virtual three-dimensional environments, these interactions and changes to these elements are propagated to other users within these environments in real time.

18 Claims, 25 Drawing Sheets

Related U.S. Application Data

(60) Provisional application No. 63/070,764, filed on Aug. 26, 2020.

(56) References Cited

U.S. PATENT DOCUMENTS

| | | | |
|---|---|---|---|
| 10,768,613 | B2 | 9/2020 | Rutherford |
| 2005/0165815 | A1 | 7/2005 | Ozzie et al. |
| 2005/0171970 | A1 | 8/2005 | Ozzie et al. |
| 2007/0005719 | A1* | 1/2007 | Szeto ............... H04L 67/34 709/207 |
| 2009/0254843 | A1* | 10/2009 | Van Wie ............ H04L 67/131 707/999.005 |
| 2013/0005382 | A1 | 1/2013 | Landstrom et al. |
| 2013/0141418 | A1* | 6/2013 | Edholm ............... G06N 3/006 345/419 |
| 2016/0028857 | A1 | 1/2016 | Dickinson et al. |
| 2017/0003738 | A1* | 1/2017 | Silkin ................ A63F 13/214 |
| 2017/0257413 | A1 | 9/2017 | Markan et al. |
| 2017/0337253 | A1* | 11/2017 | An ..................... G06F 16/27 |
| 2018/0364853 | A1* | 12/2018 | Pahud .................. G06F 3/0393 |
| 2019/0188895 | A1* | 6/2019 | Miller, IV ............. G06F 17/18 |
| 2019/0362312 | A1* | 11/2019 | Platt .................... G06Q 10/10 |
| 2020/0117178 | A1 | 4/2020 | Rutherford |
| 2020/0126308 | A1 | 4/2020 | Moroze et al. |
| 2020/0328908 | A1* | 10/2020 | Howland ............... H04L 9/008 |
| 2021/0366174 | A1* | 11/2021 | Reilly .................. H04N 23/90 |
| 2022/0066621 | A1* | 3/2022 | Appelbaum ........... H04L 65/80 |

OTHER PUBLICATIONS

Thomas Hilfert et al., "Low-cost virtual reality environment for engineering and construction," Visualization Enginerring, SpringerOpen Journal, Jan. 7, 2016.

Office Action mailed Jan. 12, 2022 in U.S. Appl. No. 17/411,910.

Notice of Allowance mailed Mar. 16, 2022 in U.S. Appl. No. 17/411,910.

Notice of Allowance mailed Sep. 21, 2022 in U.S. Appl. No. 17/839,584.

Notice of Allowance mailed Jan. 22, 2024 in U.S. Appl. No. 18/067,764.

* cited by examiner

REAL-TIME GEOSPATIAL COLLABORATION SYSTEM

CROSS-REFERENCE TO RELATED APPLICATIONS

The present application is a continuation of U.S. patent application Ser. No. 18/067,764 filed Dec. 19, 2022, which is a continuation of U.S. patent application Ser. No. 17/839,584 filed Jun. 14, 2022, now U.S. Pat. No. 11,561,670, which is a continuation of U.S. patent application Ser. No. 17/411,910 filed Aug. 25, 2021, now U.S. Pat. No. 11,392,263, which claims the benefit of U.S. Provisional Patent Application No. 63/070,764, filed Aug. 26, 2020, all of which are incorporated herein by reference in their entireties.

FIELD

The present disclosure relates generally to systems and methods for facilitating real-time geospatial collaboration in a virtual three-dimensional environment. More specifically, techniques are provided to deploy a framework to enable users to collaborate, in real-time, within a virtual three-dimensional environment using virtual reality devices, augmented reality devices, and two-dimensional displays.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a computer-implemented method is provided. The computer-implemented method comprises receiving a request from a first user to create a virtual three-dimensional room. The virtual three-dimensional room comprises a set of interactable elements and is accessible using virtual reality systems, augmented reality systems, and desktop systems. The computer-implemented method further comprises creating the virtual three-dimensional room. The computer-implemented method further comprises receiving a request from a second user to join the virtual three-dimensional room. The computer-implemented method further comprises providing element data corresponding to the three-dimensional room and to the set of interactable elements. When the element data is received, the element data causes a device corresponding to the second user to display the virtual three-dimensional room and the set of interactable elements. The computer-implemented method further comprises detecting interaction with an interactable element by the first user. The computer-implemented method further comprises propagating in real time the interaction with the interactable element to the device corresponding to the second user. When the interaction is propagated to the device corresponding to the second user, the interaction with the interactable element by the first user is displayed in real time.

In accordance with another embodiment of the present disclosure, a system is provided. The system comprises one or more processors and memory storing thereon instructions that, as a result of being executed by the one or more processors, cause the system to perform operations including the operations of the computer-implemented method described above.

In accordance with another embodiment of the present disclosure, a non-transitory, computer-readable storage medium is provided. The non-transitory, computer-readable storage medium stores thereon executable instructions that, as a result of being executed by one or more processors of a computer system, cause the computer system to perform operations including the operations of the computer-implemented method described above.

In accordance with any of the embodiments described herein, wherein the first user and the second user access the virtual three-dimensional room using different types of systems, and wherein the types of systems include the virtual reality systems, the augmented reality systems, and the desktop systems.

In accordance with any of the embodiments described herein, wherein the virtual three-dimensional room is implemented using a hierarchical component-based model-view-viewmodel (MVVM) decentralized application.

Any of the embodiments described herein may include automatically executing one or more plugins on a real time stream processor (RSP) that implements the virtual three-dimensional room, and wherein operations performed by the one or more plugins are propagated in real time to the first user and the second user.

In accordance with any of the embodiments described herein, wherein the virtual three-dimensional room is implemented to facilitate network communications, and wherein the network communications are performable through encrypted JavaScript Object Notation (JSON) data.

Any of the embodiments described herein may include generating virtual avatars in the virtual three-dimensional room, wherein the virtual avatars graphically represent the first user and the second user, and wherein movements of the virtual avatars correspond to actual movements of the first user and the second user.

Any of the embodiments described herein may include detecting interaction with another interactable element by the first user, wherein access to the other interactable element is restricted to users assigned to a role; determining that the second user is not assigned to the role; and preventing propagation of the interaction with the other interactable element to the device corresponding to the second user such that the interaction is not displayed on the device corresponding to the second user.

BRIEF DESCRIPTION OF THE DRAWINGS

The present disclosure is described in conjunction with the appended Figures.

Figure 1:
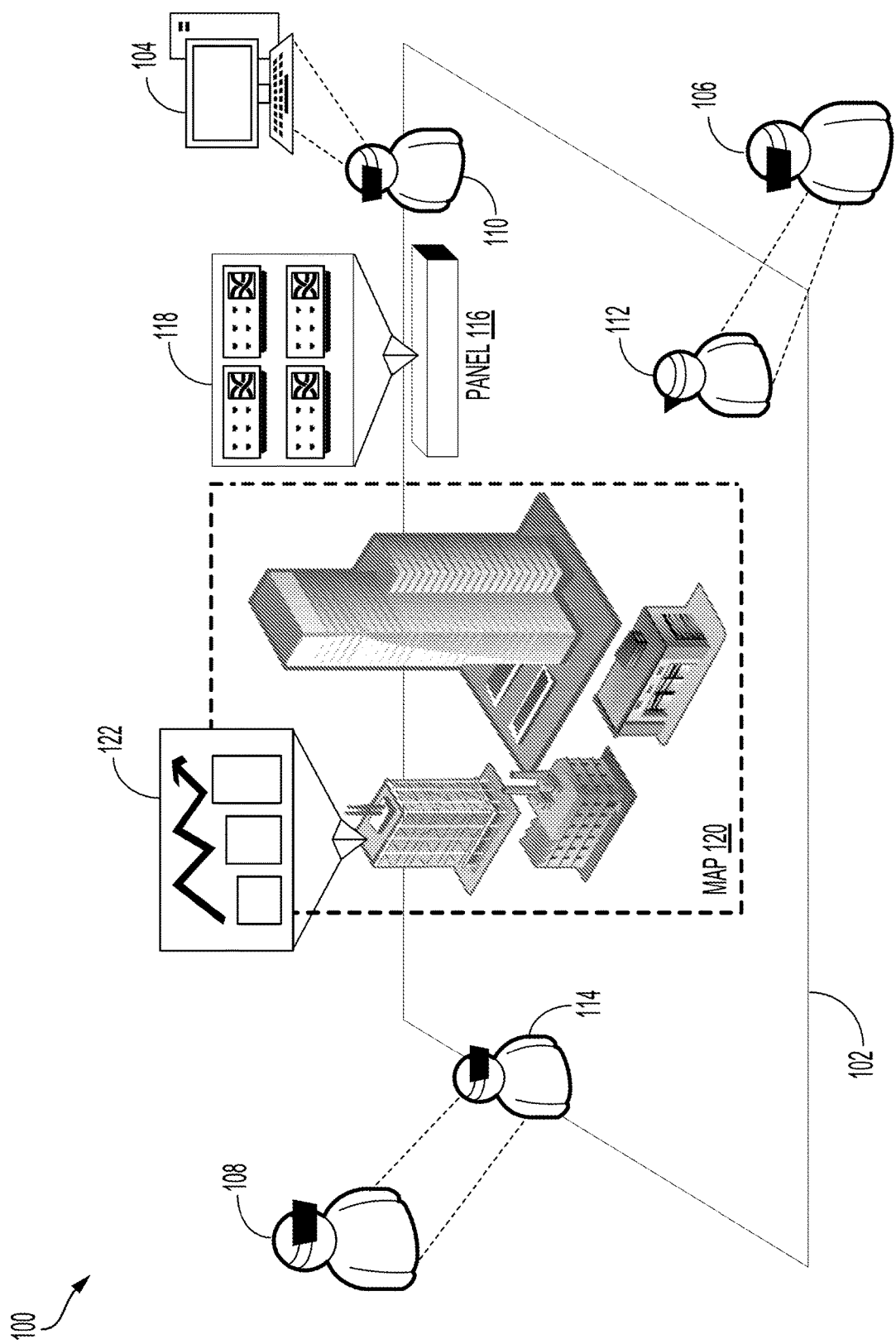
FIG. 1 shows an illustrative example of an environment in which a group of users interact with various elements collaboratively in real-time in a virtual three-dimensional environment in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Further, the ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment(s). It is understood that various changes can be made in the function and arrangement of elements without departing from the spirit and scope as set forth in the appended claims.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 shows an illustrative example of an environment 100 in which a group of users 104-108 interact with various elements collaboratively in real-time in a virtual three-dimensional environment in accordance with at least one embodiment. In the environment 100, a group of users 104-108 may be virtually present within a virtual three-dimensional room 102 presented by a collaborative virtual environment service. The collaborative virtual environment service may provide users with a geospatially-aware environment that allows these users to visualize a multi-domain space through which the users may interact with various elements simultaneously in real time. For instance, within a virtual three-dimensional room 102, users 104-108 may simultaneously interact with and analyze sensor feeds, network data, collection platforms, existing web/desktop applications, telemetry, tagged assets, imagery, aerial footage/ streaming video, and the like. The collaborative virtual environment service may also provide an interface to multi-dimensional data sets generated using machine learning techniques and/or artificial intelligence systems.

The collaborative virtual environment service may support virtual reality systems, augmented reality systems, and desktop systems simultaneously. For instance, as illustrated in FIG. 1, user 104 may utilize a desktop system to access the virtual three-dimensional room 102, whereby the virtual three-dimensional room 102 is represented on the desktop system using a two-dimensional display. The user 104 may utilize a three-dimensional mouse to navigate its avatar 110 within the virtual three-dimensional room 102. As another example, user 106 may utilize an augmented reality system, whereby elements of the three-dimensional room 102 are represented within the user's physical environment through use of augmented reality hardware devices (e.g., augmented reality goggles, etc.). The user's interactions within the augmented reality environment may be mirrored within the virtual three-dimensional room 102 and represented via its avatar 112. As yet another example, user 108 may utilize a virtual reality system, whereby the user 108 may be immersed in the virtual three-dimensional room 102 from a first-person perspective and, via movements detected by the virtual reality system, move its avatar 114 within the virtual three-dimensional room 102.

In an embodiment, the collaborative virtual environment service implements a hierarchical component-based model-view-viewmodel (MVVM) decentralized application that represents and abstracts the code necessary to create virtual and augmented reality applications that are shared across various users, such as users 104-108. This may allow software developers to create applications in a domain space where these developers may not have technical knowledge to perform in. Further, this may handle the communication and data synchronization across numerous users without plugin developers needing to implement networking code. The view and viewmodel of the MVVM may be made up of interactable elements and may be implemented in the client. The model may be made up of interactable elements that are implemented in the library that is used by the client and plugin.

The viewmodel and model may be built of individual components that can be reinstrumented across numerous domains. These components may attach to core objects of the collaborative virtual environment service and allows for the construction of individual components, unaware of one another, into a larger piece.

The collaborative virtual environment service client may handle the view and viewmodel portions of the MVVM framework utilizing interactable elements. This client may handle rendering, user interaction, and mathematical operations required for proper visual layout of data. The view of the MVVM utilizes Unity's feature set as well as custom rendering layers to help in the display of the model. The view may be unaware of any of the model. The viewmodel may handle listening to model state changes and appropriately drives the properties read by the view.

The viewmodel objects of the client may be composed of interactable elements. These objects may be layers binding a backing interactable element from the model to the attached interactable components on the item. Interactable components may be dynamic components that handle ingesting specific model changes to update the view and also write back to the model based on user interaction. For instance, an interactable market (the representation of a geolocated object residing on a projected map 120) may comprise a geolocation component, a color component, a size component, a heading component, and various other components that comprise the final object. These components may be re-used within the environment. This same geolocation component may reside on the map 120, overlay, etc. The color component may be re-used across markers, models, drawings, graphs, a user's heads-up display (HUD), and the like. These components may be automatically constructed. For instance, by looking at the property and interfaces composing a model object from the library, it can be broken apart based on the properties it includes and automatically bind interactable components needed to display and interact with it.

The library of the collaborative virtual environment service may compose the model of the MVVM structure with the component being the interactable element. The interactable element is hierarchical in structure. For instance, the interactable element may hold, at its root, a room element corresponding to the virtual three-dimensional room 102. This room element may include collections of user elements and container elements. A container element may serve as the core data binding for internal and external data that is represented in the room 102. For instance, the map 120, the graph 122, the panel 116 and corresponding data elements 118, browsers, desktops, and additional containers may be found rooted in this hierarchy.

Interactable elements may only hold data and notify the correct recipients to changes in that data. A user may utilize classical listeners for data changes or an element component. The element component may comprise logical operations and changes that a user wants to be executed based on element changes or updates from external sources. The element component may have automatic databinding attributes that are thread safe and aggregated making use of a property_changed system provided by the collaborative virtual environment service. These components may allow for an extension of functionality in a generic fashion and may serve as the core to providing logic outside of the client, such as in plugins, server-sided functionality, and customized feature sets that can run permanently, whether in the virtual three-dimensional room 102 that is acting on the interactable element data or not.

The collaborative virtual environment service, in an embodiment, provides a plugin system that serves as one component of the model. This system may drive software developers to focus primarily on their data and displaying it to end users. Using various event-driven techniques, plugin developers can respond to interactions a user makes, add new data to the user's space, and respond to changes to that same interactable element data. For example, if user 104, via its avatar 110, clicks on the panel 116, a plugin may present the user 104 with an element 118 that includes a video feed of various features from an external source. As the user 104 interacts within this video feed, the plugin may respond to these interactions and update the panel 116 and corresponding element 118 in real time. Further, these changes may be propagated to the other users 106-108 that may be presented within the virtual three-dimensional room 102. The data presented may also be allowed to be driven by multiple plugins simultaneously that are loaded by end users.

Plugins may be written using classical programming languages or utilize the element component provided by the collaborative virtual environment service. By using the element component, plugins can permanently attach code to interactable elements that run at regularly scheduled intervals or based on changes to that underlying data. This may allow plugins to extend beyond the confines of a virtual three-dimensional room and focus on the data itself and how the data is mutated. Plugin developers may connect and drive the data that is processed via the collaborative virtual environment service.

The databinding that may occur across the aforementioned components may be driven by a number of libraries and interfaces. The core of any collaborative virtual environment service instance may be the virtual three-dimensional room 102, which may be driven by a server maintained by the collaborative virtual environment service. This server may connect multiple users (such as users 104-108) together to be available within the same space. When users join the space, these users may begin communication of their device's information so that all users can see and express the same data simultaneously. As an illustrative example, if user 108, via its avatar 114, interacts with a marker of the map 120, resulting in the presentation of graph 122 within the virtual three-dimensional room 102, the interaction and presentation of the graph 122 may be presented to the other users 104-106 simultaneously in real time via their representation of the virtual three-dimensional room 102.

On the client side, an application programming interface (API) may be provided that runs on a separate thread processing user interaction and forwards that information to the collaborative virtual environment service server. This same process may receive information from the server, which is then processed and displayed by the client to the corresponding user.

In an embodiment, users can boot up plugins that process data. These plugins may be driven remotely and operate as end users. The server may boot up a containerized application and run the plugin. The plugin may be fed with all information about the current state of the virtual three-dimensional room 102 so that the plugin may begin responding and adding its own information to the space. This may allow for decentralization of CPU usage of all applications. For instance, a resource-intensive plugin may be executed on its own computer and feed the necessary data to the collaborative virtual environment service as needed. This may be done across numerous instances such that clients, other plugins, and the server do not monopolize resources from each other.

In an embodiment, the collaborative virtual environment service client supports loading custom-made plugins to provide additional functionality within a virtual three-dimensional room 102. For instance, plugin developers may utilize the element library of the collaborative virtual environment service to develop these plugins. Plugins may be loaded from a directory on a user's device, as specified in a configuration file, and are available for the user to activate via an in-application menu. Plugins may have no restrictions on the element data they can access and modify.

The aforementioned element library may provide various features, such as user interaction events, to which plugins can listen and take action. These features may be divided into property changes, collection changes, and user interaction events. Local plugins may function in both online and offline virtual three-dimensional rooms, while server plugins may only work in online virtual three-dimensional rooms.

Whenever a property of an element changes, whether by a local user, local plugin, or remote user, the element may fire an event with the name of the property that was changed. A property may be a simple feature of an element, such as a color on a marker element. Plugins may be able to attach to this event and run any custom code as desired. Property changes may be networked, such that a local plugin can execute code in response to a user interaction from anyone in the virtual three-dimensional room 102.

Particular elements may further include collections of other elements. For instance, as illustrated in FIG. 1, a map element 120 may include a marker element that may be connected to a graph element 122 that may be presented as a result of user interaction with the marker element. Whenever items are added, removed, or reordered in a collection, the collection may fire an event detailing what changes were made to the collection. For instance, if a user adds data to a marker element of the map element 120, the collection may fire an event detailing this addition of data to the marker element and the corresponding map element 120. Collection changes may be networked such that a local plugin can execute code in response to a collection change caused by a remote user or plugin.

In an embodiment, user interactions with elements within the virtual three-dimensional room will fire events based on the interaction. For instance, if a user clicks on a marker element within the map element 120, this may result in an event being fired that results in the presentation of the graph element 122. This may provide plugins the ability to execute code when a user interacts with certain data. Certain elements may have click events while others may have hover events. Events may be networked and the session identifier of the user who caused the event is included. This may allow a local plugin to execute code to respond to user interaction from anyone in the room 102.

The collaborative virtual environment service server may serve as an intermediary to all data and may be represented through one or more servers. A master server may connect users so that they may find out what virtual three-dimensional rooms are available to join. These rooms can be private, public, locked, or joinable. A user can also create a new room to join and open up the room to others. When a room is created, message broker streams are generated for queueing up and down the data.

The collaborative virtual environment service, in an embodiment, implements a real time stream processor (RSP) that is used to connect clients together as well as plugins that are booted up and running. Clients may be operating on standalone devices and may not reside on the RSP. Plugins, however, may optionally be loaded on the same device or botted on a separate device based on its configuration. Plugins may be containerized such that unreliable or malicious plugins cannot monopolize resources or perform dangerous operations.

Server plugins may be supported by running plugins directly on the RSP in an online virtual three-dimensional room. Server plugins may perform similar operations to those of local plugins described above. These server plugins may perform complex calculations without affecting the framerate of a user's application and may be available in the virtual three-dimensional room 102 regardless of who connects and disconnects from the virtual three-dimensional room 102.

Plugins and clients, whether local or remote, may perform through network communication with the collaborative virtual environment service server. This communication is performed through token-based, compressed and encrypted JavaScript Object Notation (JSON) data that the RSP processes. The RSP may ingest this data into numerous message broker clusters that relay out to other users and plugins, as well as store the data to speed up the immediacy of when new uses join a virtual three-dimensional room 102. It should be noted that while JSON data is used extensively throughout the present disclosure for the purpose of illustration, other parsable formats may be used.

The data written by the RSP into the message broker may be permanently stored for historical storage of the virtual three-dimensional room 102. This may end users to audit old room states and playback the state of the virtual three-dimensional room 102 to ascertain the data viewed, modified, and interacted with. The RSP may further determine when a plugin or user is allowed to view or manipulate data. This may be dependent on the security level of a user or the permissions given to a plugin.

In addition to the RSP, the collaborative virtual environment service may implement a filter server. The filter server may provide users with the ability to create and join rooms, forwarding messages reliably and unreliably to other users in the virtual three-dimensional room, allowing reconnection, and verifying JSON web tokens (JWTs) or other cryptographic tokens upon connection.

As illustrated in FIG. 1, a virtual three-dimensional room 102 may include the containers and active users 104-108 interacting on that data. The virtual three-dimensional room 102 may dictate what networking data propagates to which users. Each user 104-108 may have a unique virtual three-dimensional environment in which the virtual three-dimensional room 102 is loaded. This virtual three-dimensional environment may house a user's rooms that the user may interact with. A user's embodiment within its virtual three-dimensional environment may house its digital movement and generic information such as their display name, profile picture, session identifier, roles, and permissions.

Each user may have a corresponding avatar (e.g., users 104-108 have corresponding avatars 110-114, respectively) that represents the user's visual embodiment within a virtual three-dimensional environment. Within a virtual three-dimensional room 102, an avatar of a user within the room may be displayed that may speak, look, and react to objects in their vicinity. An avatar may have customization functionality so that users can be properly represented within a virtual three-dimensional room 102. For instance, a user may customize its avatar to appear as a three-dimensional representation of the user's actual appearance. In some instances, a user may customize its avatar to provide a live video feed of the user that may be presented to other users within a room.

Within a room, a virtual head may be presented that correlates to a user's head in the real world. In virtual reality implementations, the virtual head may track a user's physical presence and provides a digital orientation. This may allow a user to see and navigate the space as well as allow others to identify what the user is focused on at any given time. In addition to a virtual head, a virtual hand element may be implemented for a user, which may correlate with the user's hands in the real world. In virtual reality implementations, the virtual hand may track the user's physical presence and digital orientation. Further, this may allow the user to see and interact with items, whether that is using a controller in the user's hands, physical hand gestures, or digitally grabbing objects in that space.

A pointer element may be provided to extend a user's length of interaction for grabbing, selecting, dragging, scrolling, and the like. The pointer element may be used with a mouse, virtual reality controllers, or lasers digitally extending from a digital hand element.

Voice elements may be recorded and propagated to all users in the rooms that a user is currently in. For instance, if user 104 generates a voice element within the virtual three-dimensional room 102, the voice element may be automatically propagated to the other users 106-108 within the virtual three-dimensional room 102. This may allow users 104-108 to speak to one another in real-time through use of these voice elements.

Panels, such as panel 116, may be two-dimensional displays that can be placed in the room 102. Panels may allow for classical graphical user interface (GUI) interactions with user interface (UI) elements such as buttons, sliders, textboxes, images, and videos. Panels may also support more nuanced features such as web cameras, shared desktops, server-sided browsers, and the like.

The map element 120 may display a geolocated virtualized display of real world locations from various endpoints and providers in the three-dimensional environment (e.g., virtual three-dimensional room 102). The map element 120 may not be flat but rather include three-dimensional projected data to replicate and describe the locations in the physical world. The map element 120 may support active display of the map as a projected and geolocated globe that can support the curvature of the Earth, the Moon, Mars, or any other celestial body in the same visual space. The map element 120 may bridge projected data of water, terrain, underground features, man-made and natural satellites, and other bodies in the solar system in natural relation to each other. The display of the map element 120 may be supported by tile providers, such as a web map tile service or other entities that provide geospatial-intelligence data.

A map element 120 may be associated with map data (e.g., maps obtained from mapping services such as Google Maps®, MapQuest®, etc.), which may be additive data provided in addition to data provided by various providers. The map data may include data with a given geolocation. Geolocated data may be represented through longitude, latitude, vertical position, and vertical type. Vertical types may allow users to define how a geolocated item is projected on the map element 120. Map data may include map overlays, map markers, and map drawings. Map overlays display a texture that drapes over the features of the map element 120 at the correct geolocated coordinates. Map markers may each represent a single geolocated point at the correct geolocated coordinates. Supplemental data may be attached to markers (e.g., meshes, point clouds, event containers, etc.). Event containers may bring up additional panels, graphs, an additional map, and further containers. Map drawings may represent sequences of geolocated points that can optionally be displayed as a Bezier curve for seamless curvature.

Similar to a map element 120, a globe element may be introduced. A globe element may provide a generalized version of geolocated data displayed on a globe diorama. This may provide general context and awareness at a macro scale. The globe element may support globe markers and globe drawings, which may be analogous to the map markers and map drawings described above.

Other three-dimensional elements may be introduced in a virtual three-dimensional room 102. For instance, generic three-dimensional content may be loaded into a room, such as visual indicators, Lidar data, architecture, and the like. For instance, a user may import and display a mesh-based model within a virtual three-dimensional room 102. Further, a user may import and display point-based content, such as point clouds, within the virtual three-dimensional room 102 and scale the point-based content as needed.

The collaborative virtual environment service may further support skybox elements. Skybox elements may include content that surrounds the user in all directions. This may be used to replace the outer surrounds of a virtual space with, for example, real world 360-degree content. In some instances, a user may introduce a skybox element that simulates an office environment, a control center environment, and the like. When a component of a skybox element is not active, the component may be displayed as a bubble floating in space. At any point, a user may activate the content to surround the user. This may allow users and plugins to seamlessly swap out the current surrounding content. Skybox elements may include video skyboxes, street view skyboxes, texture skyboxes, video stream skyboxes, and the like.

Graph elements may allow for generic linking of nodes in a three-dimensional space with dynamic edge linkings where appropriate. A graph node may represent a three-dimensional position in relation to the center of the graph. Similar to the aforementioned map marker, supplemental data can be attacked to graph nodes such as meshes, point clouds, and event containers. These containers may, in turn, be used to bring up additional panels, graphs, additional maps, and further containers. Graph edges may specifically link nodes that are in the same graph to provide relational context.

The collaborative virtual environment service may further support generic edge elements. A generic edge element may be used to link any collaborative virtual environment service data to other content. A user can create an edge element from a user's head to a panel, a map marker to a graph node, a map marker to a panel, a container to another container, and the like. Edge elements may dynamically store themselves at the highest level of an element tree to have their links as children. Thus, if an edge element links across containers, the edge element cannot be saved with that data. There may need to be a union upon the containers by creating copies and linking or reattach the containers to a related container. If no container is found, edge elements may continue up to the room element or space element which is not persistent.

Figure 2:
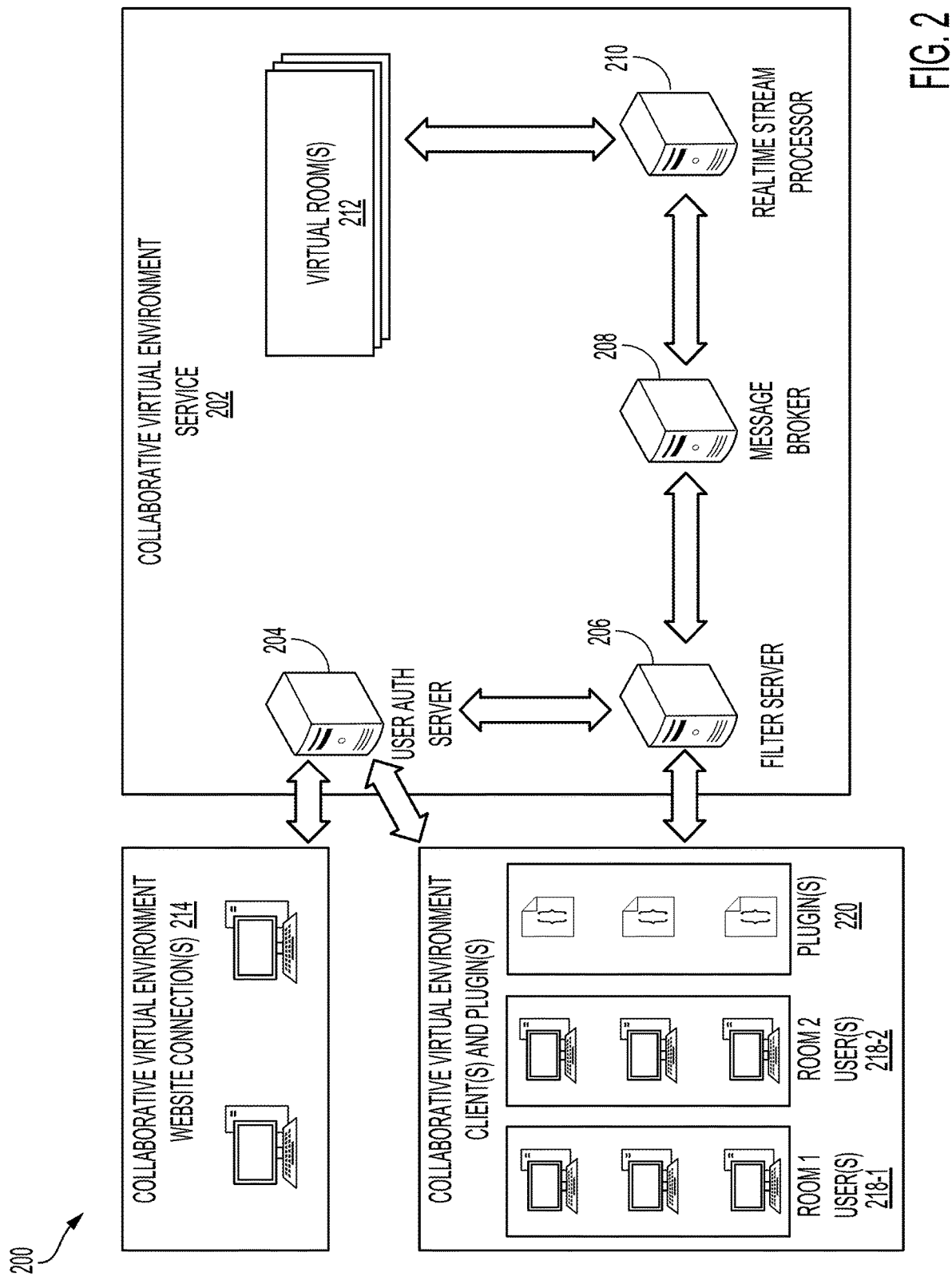
FIG. 2 shows an illustrative example of an environment in which a collaborative virtual environment service provides various micro-services for implementation of collaborative virtual three-dimensional environments in accordance with at least one embodiment.

FIG. 2 shows an illustrative example of an environment 200 in which a collaborative virtual environment service 202 provides various micro-services for implementation of collaborative virtual three-dimensional environments in accordance with at least one embodiment. In the environment 200, a client sends user-inputted credentials to a user account and authentication server 204 to request access to a virtual three-dimensional room 212 of the collaborative virtual environment service 202. The user account and authentication server 204, in an embodiment, operates as an OAuth2 authorization server providing JavaScript Object Notation (JSON) web tokens (JWTs) or other cryptographic tokens to authenticating clients, which can be verified by a filter server 206 of the collaborative virtual environment service 202.

The client may submit its credentials via a collaborative virtual environment website connection 214 or directly to the user account and authentication server 204. In response to obtaining a JWT or other cryptographic token from the user account and authentication server 204, a client may use the token in the authorization header of a websocket request to the filter server 206, which may result in a room creation message being made through the websocket.

As noted above, the user account and authentication server 204 may be the source of authentication for clients of the collaborative virtual environment service 202. Accounts with the collaborative virtual environment service 202 may be registered and administered via a web portal, which may be accessed via a collaborative virtual environment website connection 214. In some instances, the registration process may be open by default but may be restricted to administrative users, whereby administrative users may be required to access the collaborative virtual environment service 202 to register account on behalf of other users. If a user utilizes a service client to access the collaborative virtual environment service 202 (e.g., room 1 users 218-1, room 2 users 218-2, etc.), an OAuth2 client credentials flow may be used, and the user account and authentication server 204 may respond with a JWT or other cryptographic token if the credentials supplied by the user are valid. In some instances, the user account and authentication server 204 utilizes a separate database to maintain account information for the various users of the collaborative virtual environment service 202.

The filter server 206 provides the ability to create and join virtual three-dimensional rooms 212, forward messages to other users in a room 212, allows reconnection, and verifies JWTs or other cryptographic tokens upon connection. On server boot, the filter server 206 connects to the user account and authentication server 204 to obtain the public cryptographic key of the user account and authentication server 204. This public cryptographic key is used to validate the digital signatures of the JWTs or other cryptographic tokens that clients provide without need to send requests to the user account and authentication server 204 for validation.

In an embodiment, the filter server 206 is implemented without a user interface (UI) and is configured to support websocket connections from clients. A client seeking to access a virtual three-dimensional room may be required to present a valid JWT or other cryptographic token in the authorization header of a websocket connection request to the filter server 206. Once a user is connected to the filter server 206, the filter server 206 may create a UserSession entity in its database and sends a message on a message broker topic (e.g., "user-joined-up") maintained by a message broker 208 to indicate that a new user has connected and requires a unique session identifier. In an embodiment, the real time stream processor 210 may be subscribed to this topic and may detect this message. In response to this message, the real time stream processor 210 may generate a session identifier for the user and sends the response on another message broker topic (e.g., "user-joined-down") maintained by the message broker 208. The filter server 206 may be subscribed to this particular topic and may detect this message from the real time stream processor 210. In response to receiving this message from the topic, the filter server 206 may update its database with the session identifier and forwards the message to the client that submitted the request.

Once the unique session identifier has been assigned, the client may be able to join or create a virtual three-dimensional room 212. For instance, a client may submit a request to the filter server 206 to join an existing virtual three-dimensional room. The request may include a unique room identifier corresponding to the virtual three-dimensional room that the client wishes to join. In response to the request, the filter server 206 may determine whether the specified room exists. If the specified room does not exist, the filter server 206 may return an error message. However, if the specified room exists, the filter server 206 may transmit a room join request message to a topic maintained by the message broker 208. The real time stream processor 210 may obtain, from the topic, the room join request message and process the request. The real time stream processor 210 may return a snapshot of the room, which may be loaded by the client.

If a client submits a request to create a virtual three-dimensional room, the filter server 206 may determine whether the room does not already exist. For instance, the filter server 206 may check the room table within its in-memory database to determine whether a room having the name provided by the client currently exists. If so, the filter server 206 may return an error message to the client. However, if the room does not currently exist (e.g., the request is valid), the filter server 206 creates new topics on the message broker 208 with a globally unique identifier (GUID) appended to the name of these topics (e.g., "element-changes-up-{GUID}," "element-changes-down-{GUID}," etc.). The filter server 206 may further send a message on a topic (e.g., "room-changes-up" to indicate to the real time stream processor 210 that it is to begin consuming and producing messages on these topics. When the real time stream processor 210 receives the room request, it attaches its consumer and producer and sends a room snapshot to another topic (e.g., "room-changes-down"). The filter server 206 may obtain the room snapshot from this topic and forwards the room snapshot to the client, which then enters the virtual three-dimensional room.

In an embodiment, when users interact with objects in a virtual three-dimensional room 212, each change is transmitted to the filter server 206 to forward these interactions to other users within the room. For instance, the filter server 206 may read and write metadata to the message before passing it on. For each element change that a client sends, the client sends an auto-incrementing client offset, which is stored in the UserSession on the filter server 206. This offset may be used for reconnection purposes in order to prevent the loss of client changes in the event of a disconnection and to prevent messages from being processed more than once.

In an embodiment, a client periodically polls the filter server 206 for the last client offset that the filter server 206 has processed. In response, the filter server 206 may provide the client offset stored in the UserSession associated with the connection and the client keeps track of that value. The element change data is sent from the filter server 206 to a topic (e.g., "element-changes-up-{GUID}") of the message broker 208 corresponding to the virtual three-dimensional room 212, which the real time stream processor 210 reads and echoes to another topic (e.g., "element-changes-down-{GUID}"). The filter server 206 may read this echoed message and transmits the message to all users in the virtual three-dimension room 212 except for the user who generated the element change. The filter server 206 may add an additional field of metadata (the server offset) before sending this message to the clients. The server offset is the offset in the topic maintained by the message broker 208 that corresponds with the message. Clients may track this value for reconnection purposes. For instance, a client may be able to request messages beginning at a server offset on reconnection based on the offset of the last message received.

In an embodiment, if a user is temporarily disconnected from a virtual three-dimensional room 212, the reconnecting client of the user can send its previously assigned session identifier, server offset, and the name of the virtual three-dimensional room 212 to the filter server 206. The filter server 206 may verify that there was a UserSession with the provided session identifier which was previously in that room and initializes the message broker consumer to start reading from the provided server offset. This ensures that the client can read all messages that were sent from other users while the client was disconnected from the room. Additionally, the filter server 206 sends a reconnection response which includes a value indicating whether the reconnection was successful, and the last client offset that the server had received before disconnection. The client buffers all messages it sends until the filter server 206 acknowledges a client offset greater than the message's offset. This allows the client to still have all the changes it made while disconnected. Further, this allows the client to send all messages that the client has generated with an offset larger than the last server-acknowledged client offset, thereby ensuring that no messages are lost.

The filter server 206 also provides multicast functionality of unreliable data (UDP). Unreliable data may be forwarded immediately to all other clients in a virtual three-dimensional room 212 without any added metadata from the filter server 206. Unreliable data that is missed while disconnected may not be re-sent. Additionally, UDP data may not be sent through the websocket, such that a different form of connection and authentication may be required. When a client successfully joins a virtual three-dimensional room, the filter server 206 may send a cookie verification message to the client through the websocket. The message may be a securely and randomly generated message that the client can only know because the filter server 206 sent the message. The client may be required to echo this message to the filter server 206 over UDP. When the filter server 206 receives a cookie verification packet, the filter server 206 confirms that it is a valid cookie that the filter server 206 had previously provided. The filter server 206 may echo this packet back to the client to indicate that the client has been successfully authenticated. After the filter server 206 receives the valid cookie packet, the filter server 206 tracks the Internet Protocol (IP) address and port number that the packet came from and stores this information in the UserSession for the associated websocket connection. As a result, the client is eligible to send and receive UDP data.

In an embodiment, the filter server 206 is configured to support encryption of both reliable and unreliable data. The websocket encryption may be supported using Transport Layer Security (TLS) encryption protocols via server certificates. UDP encryption may be performed using Datagram TLS (DTLS) communications protocols, which may handle the handshake process with appropriate timeouts for lost packets. If encryption is enabled on the filter server 206, websocket connections may be required to connect securely over HyperText Transfer Protocol Secure (HTTPS) protocols such that non-secure connections are rejected. UDP encryption may be implemented on a per-client basis. For instance, when a user initially connects to the filter server 206 via websocket, the client sends a message indicating whether it wishes to use encrypted UDP traffic. The filter server 206 may track this configuration when sending the cookie verification packet when the user enters a room. When forwarding UDP packets to other users in a room, the filter server 206 may decrypt the packet and, on a per-client basis, re-encrypt or directly forward the message to other connected clients. Each encrypted connection may have a different encryption key that is negotiated in the DTLS handshake process.

In an embodiment, when the last user in a virtual three-dimensional room disconnects, the filter server 206 may terminate the room. This may cause all UserSessions associated with the room and the room itself to be deleted from the in-memory database of the filter server 206. Further, the filter server 206 may terminate the topics maintained by the message broker 208 specific to the room and sends a message via a "room-changes-up" topic to the real time stream processor 210 to indicate that it should close its consumer and producer for the room and destroy any state associated with the room snapshot. This may prevent a client from trying to reconnect to the room. Further, any requests to reconnect to the room are denied. The unique name for the room is subsequently made available for re-creation.

The real time stream processor 210 may be implemented using a computer system or application executed on a computer system of the collaborative virtual environment service 202. The real time stream processor 210 may perform two primary duties: assign session identifiers and track room states for the creation of room snapshots. As noted above, the real time stream processor 210 may be subscribed to a "user-joined-up" topic maintained by the message broker 208. When a message is received on this topic, the real time stream processor 210 may assign a session identifier to the corresponding user and send the session identifier to a "user-joined-down" topic maintained by the message broker 208. Further, when a room request is received on the "room-changes-up" topic maintained by the message broker 208, the real time stream processor 210 may attach a producer and consumer to the topics specified in the message. The consumer may read all element changes and forwards these unchanged to the producer. In addition to forwarding the message, the message is processed using the same library that the client uses to track and receive element changes.

A virtual three-dimensional room 212 may be represented in a tree with a root being defined by a room element. All element changes made within a virtual three-dimensional room may result in modifications to this tree. The tree may be serialized into a JSON payload. When a user joins a virtual three-dimensional room 212, the real time stream processor 210 may serialize the state of the room at that time, resulting in a room snapshot. The real time stream processor 210 may transmit the room snapshot with a server offset from which the room snapshot was created. This may enable the client to begin loading the element data near to the current state of the virtual three-dimensional room 212. The client may send a request to the filter server 206 to start at the server offset that was specified in the room snapshot, thus skipping numerous messages in order to join the virtual three-dimensional room 212 quickly. If the client encounters an issue loading the room snapshot, the client can request to start at a null offset and process every change made to the virtual three-dimensional room from its inception. This may occur if the client and server versions of the virtual three-dimensional room are different and the client is unable to deserialize the room snapshot due to this incompatibility.

In an embodiment, the real time stream processor 210 may perform windowed message aggregation to compress duplicate element changes made over a short period of time. For instance, if an element's position is changed a number of times within a short period of time (e.g., 10 milliseconds, etc.), the real time stream processor 210 may relay the final position to other clients by compressing these changes into one.

In an embodiment, the real time stream processor 210 supports permanently saving virtual three-dimensional room states to disk or database at set intervals. This may allow the full message broker topic to be cleared, especially when no one is active in the virtual three-dimensional room 212. Further, this may allow for the recreation of the virtual three-dimensional room 212 from its previous state at any time. This may also be used as a backup if important data within a virtual three-dimensional room 212 is deleted. Through the use of these states, a virtual three-dimensional room 212 may be fast-forwarded or rewound, allowing for replay of important user interactions at any time.

The message broker 208 may be implemented as an application implemented on a computer system of the collaborative virtual environment service 202. The message broker 208 may be implemented using Apache Kafka®, which may utilize Apache Zookeeper™ to store metadata about topics and other connected brokers. The message broker 208 may be a key component in allowing concurrent reads and writes from multiple clients and in allowing client reconnection. The message broker 208 may comprise topics, which are unbounded arrays of key-value pairs. The keys of these key-value pairs may be client identifiers and the corresponding values may be the message contents. Messages may be persisted to disk by the message broker 208 before informing any consumers of new messages.

Interaction with the message broker 208 may be performed using producers and consumers. Producers may generate messages for a particular topic and consumers may read messages from a topic. Messages may not be consumed when read. Instead, each consumer tracks its offset in the topic individually and the offset is advanced for each message read. This may allow consumers to begin reading messages at any place in the topic, which is used both for room snapshots and client reconnection. When a producer's message is written to disk, all consumers are informed of the new message and begin processing this message. The message broker 208 may guarantee "exactly-one" delivery, so that consumers receive all messages and that no messages are duplicated.

The message broker 208 may also allow for horizontal scaling. For instance, the collaborative virtual environment service 202 may create additional message broker instances, with the topics synced between instances, in order to meet client and room demands. This may provide load balancing when numerous users are connected to a single server instance. The message broker 208 may automatically sync topics across broker instances such that all produced messages are available to a consumer connected to any of the broker instances.

Figure 3:
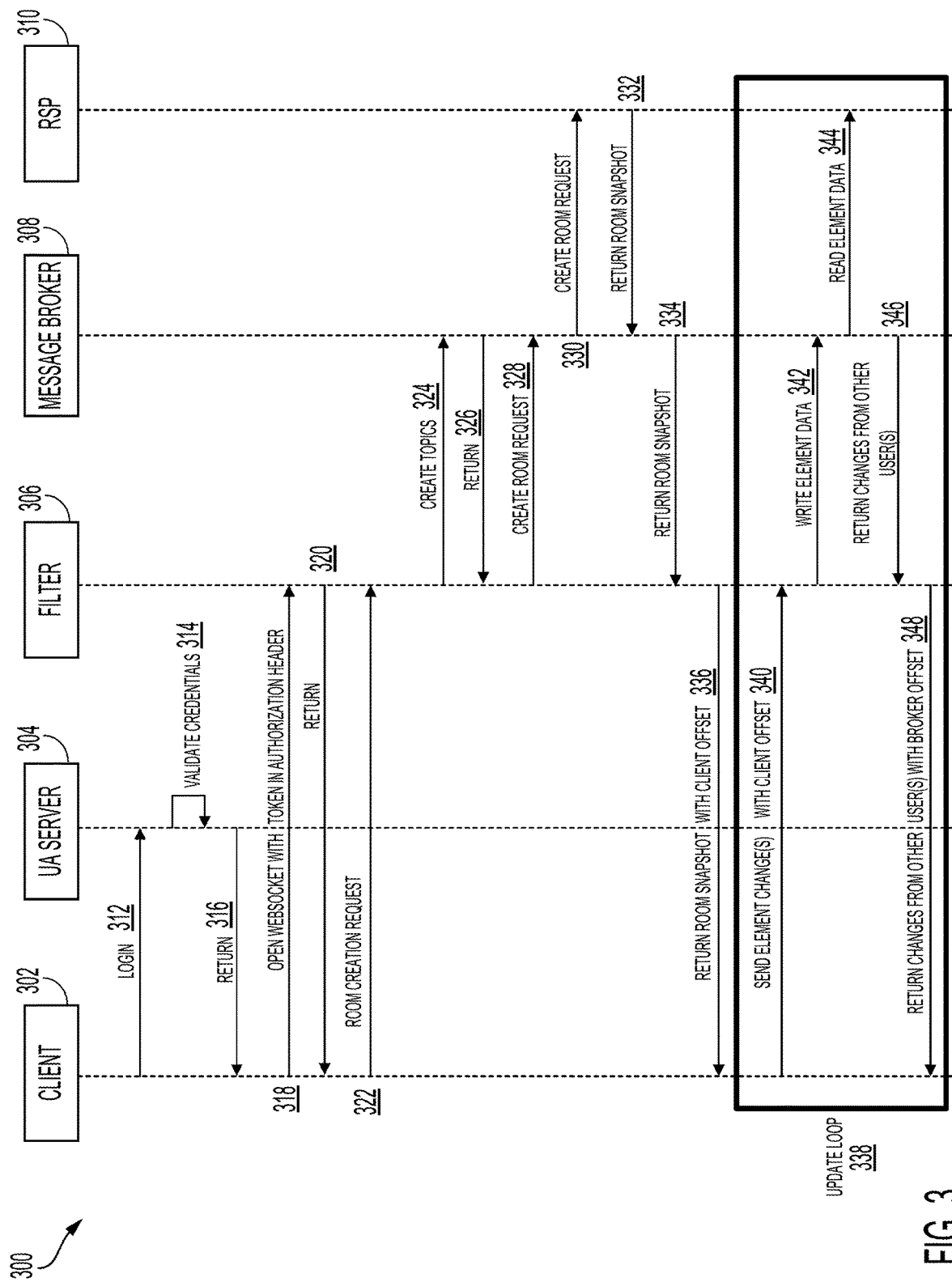
FIG. 3 shows an illustrative example of a flow diagram for creating and updating a virtual three-dimensional room within a virtual three-dimensional environment in accordance with at least one embodiment.

FIG. 3 shows an illustrative example of a flow diagram 300 for creating and updating a virtual three-dimensional room within a virtual three-dimensional environment in accordance with at least one embodiment. At step 312, a client 302 of the collaborative virtual environment service submits a request to login to a user account and authentication (UA) server 304. The login from the client 302 may be performed using an OAuth2 client credentials flow. For instance, the client may provide a unique client identifier and a client secret that may be verified by the UA server 304. The client 302 may also provide a set of credentials that may be verified by the UA server 304.

At step 314, the UA server 304 may process the login request and validate the client's credentials, including the provided client secret. If the UA server 304 determines that the provided credentials and client secret are valid, the UA server 304, at step 316, may respond with a JWT or other cryptographic token.

At step 318, the client 302 may open a websocket using the provided JWT or other cryptographic token in the authorization header of the websocket request to the filter server 306.

The filter server 306 may use the public cryptographic key of the UA server 304 to validate the digital signature of the JWT or other cryptographic token provided in the websocket request to authenticate the client 302. If the client 302 is successfully authenticated by the filter server 306, the filter server 306, at step 320, may return a response to the client 302 indicating that the websocket connection has been established.

At step 322, the client 302 may submit a room creation request to the filter server 306. The room creation request may specify a name for the room, which the filter server 306 may evaluate to determine whether a room having this name exists. If the name for the room is available, the filter server 306, at step 324, creates new topics on the message broker 308 with a GUID appended to the name (e.g., "element-changes-up-{GUID}," "element-changes-down-{GUID}," etc.). At step 326, the message broker 308 may return a response indicating the successful creation of these new topics.

Once the new topics have been created, the filter server 306, at step 328, may submit a create room request to the message broker 308. For instance, the filter server 306 may send a message on a "room-changes-up" topic to let the real time stream processor (RSP) 310 know that it should begin consuming and producing messages on the newly created topics. The RSP 310, at step 330, may obtain the create room request from the topic maintained by the message broker 308 and attaches its consumer and producer to the newly created topics. Further, at step 332, the RSP 310 may send a room snapshot to the "room-changes-down" topic maintained by the message broker 308. The message broker 308, at step 334, may return this room snapshot to the filter server 306. For instance, the filter server 306 may be subscribed to the "room-changes-down" topic and obtain a notification when a message is added to the topic. The filter server 306 may obtain the room snapshot from this topic and, at step 336, provide the client 302 with the room snapshot and a client offset.

As the client 302 performs actions within the virtual three-dimensional room, an update loop 338 may be initiated. For instance, if the client 302 interacts with one or more elements within a virtual three-dimensional room, the client 302, at step 340, may send element changes with its client offset to the filter server 306. For instance, for each element change, the client 302 may send an auto-incrementing client offset, which is stored in the UserSession associated with the client 302 on the filter server 306. In response to receiving an element change from the client 302, the filter server 306, at step 342, writes the element change to the "element-changes-up-{GUID}" topic maintained by the message broker 308 and corresponding to the virtual three-dimensional room. At step 344, the RSP 310 reads the element change data from the topic maintained by the message broker 308 and echoes to the "element-changes-down-{GUID}" topic maintained by the message broker 308 for dissemination to the other users in the virtual three-dimensional room.

At step 346, the filter server 306 obtains, from the "element-changes-down-{GUID}" topic maintained by the message broker 308, any element changes implemented by other users of the virtual three-dimensional room. For each change, the filter server 306 may add an additional field of metadata, which is broker offset, which is the offset in the topic that corresponds with the message. Clients may track this offset for reconnection purposes such that the client may be able to request messages beginning at the broker offset on reconnection based on the offset of the last message received. At step 348, the filter server 306 may provide these element changes with the broker offset to the client 302 to cause the client 302 to implement these element changes within the virtual three-dimensional room.

Figure 4:
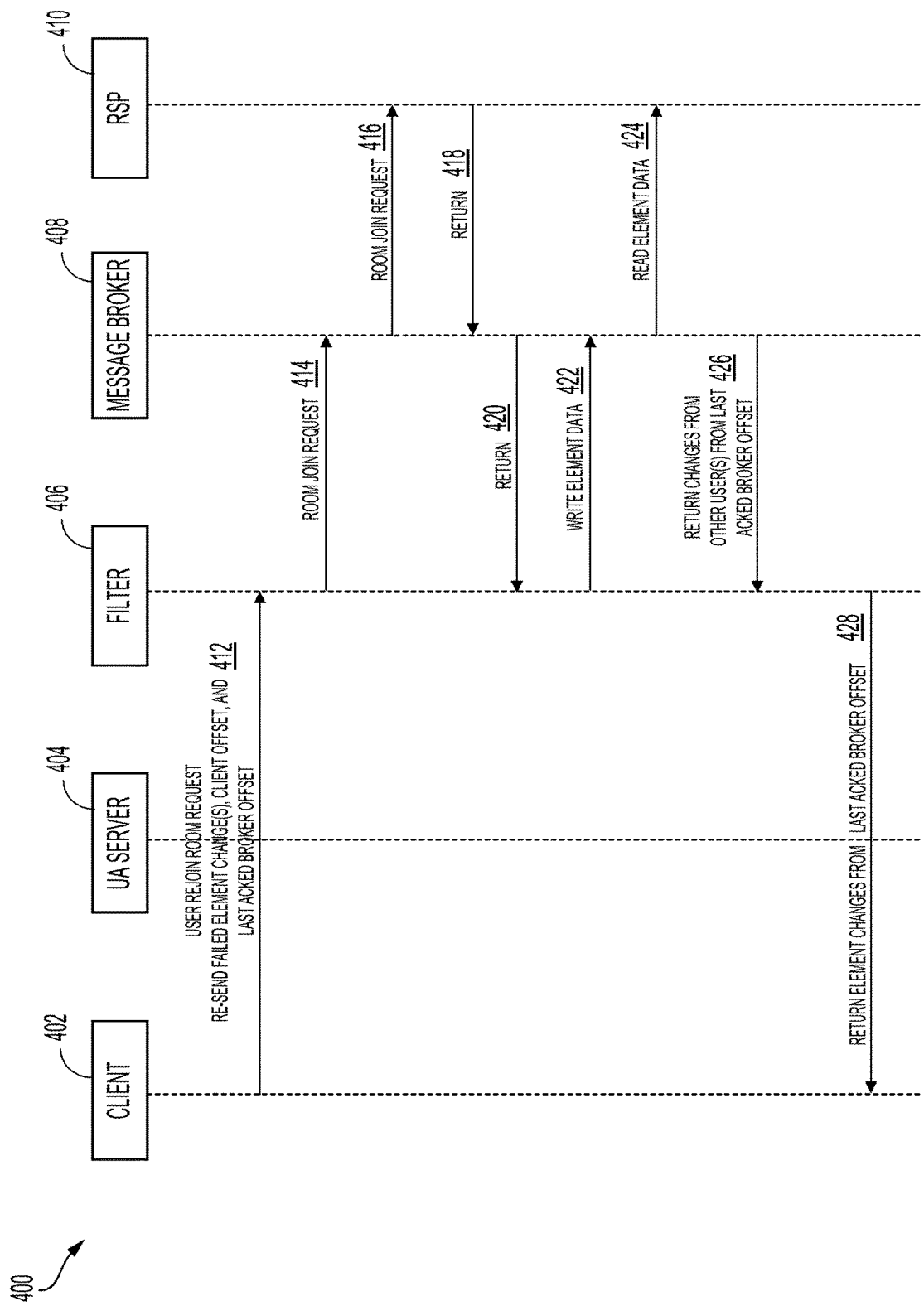
FIG. 4 shows an illustrative example of a flow diagram for joining an existing virtual three-dimensional room in accordance with at least one embodiment.

FIG. 4 shows an illustrative example of a flow diagram 400 for joining an existing virtual three-dimensional room in accordance with at least one embodiment. At step 412, a client 402 of the collaborative virtual environment service submits a request to rejoin an existing virtual three-dimensional room. The client 402 may provide its previously assigned session identifier, any failed element changes and corresponding client offset, and the last acknowledged broker offset to the filter server 406 in its request. The filter server 406 may verify that there was an existing UserSession with the provided session identifier in the virtual three-dimensional room specified in the request. If so, the filter server 406, at step 414, submits a room join request to the RSP 410 via a "room-changes-up" topic maintained by the message broker 408.

At step 416, the RSP 410 may obtain the room join request from the "room-changes-up" topic maintained by the message broker 408 and provides a return response, at step 418, that includes a room snapshot with a server offset from which the room snapshot was created. The room snapshot and server offset may be added to a "room-changes-down" topic maintained by the message broker 408. The filter server 406, at step 420, may obtain the room snapshot and server offset from the message broker 408.

The filter server 406 may provide the client 402 with a reconnection response which includes a value indicating that the reconnection was successful and the last client offset that the server had received before disconnection. The client 402 may buffer all messages it sends until the server acknowledges a client offset greater than the message's offset. The filter server 406, at step 422, may write element data in the form of these messages to the "element-changes-up-{GUID}" topic maintained by the message broker 408 and corresponding to the virtual three-dimensional room. At step 424, the RSP 410 reads the element change data from the topic maintained by the message broker 408 and echoes to the "element-changes-down-{GUID}" topic maintained by the message broker 308 for dissemination to the other users in the virtual three-dimensional room.

At step 426, the filter server 406 obtains, from the "element-changes-down-{GUID}" topic maintained by message broker 408, any element changes from other users of the virtual three-dimensional room from the last acknowledged broker offset. For instance, the filter server 406 may identify any element changes having a broker offset that is greater than the last acknowledged broker offset provided by the client 402. The filter server 406, at step 428, may return these element changes to the client 402, which may cause the client 402 to start loading these element changes for the virtual three-dimensional room.

Figure 5:
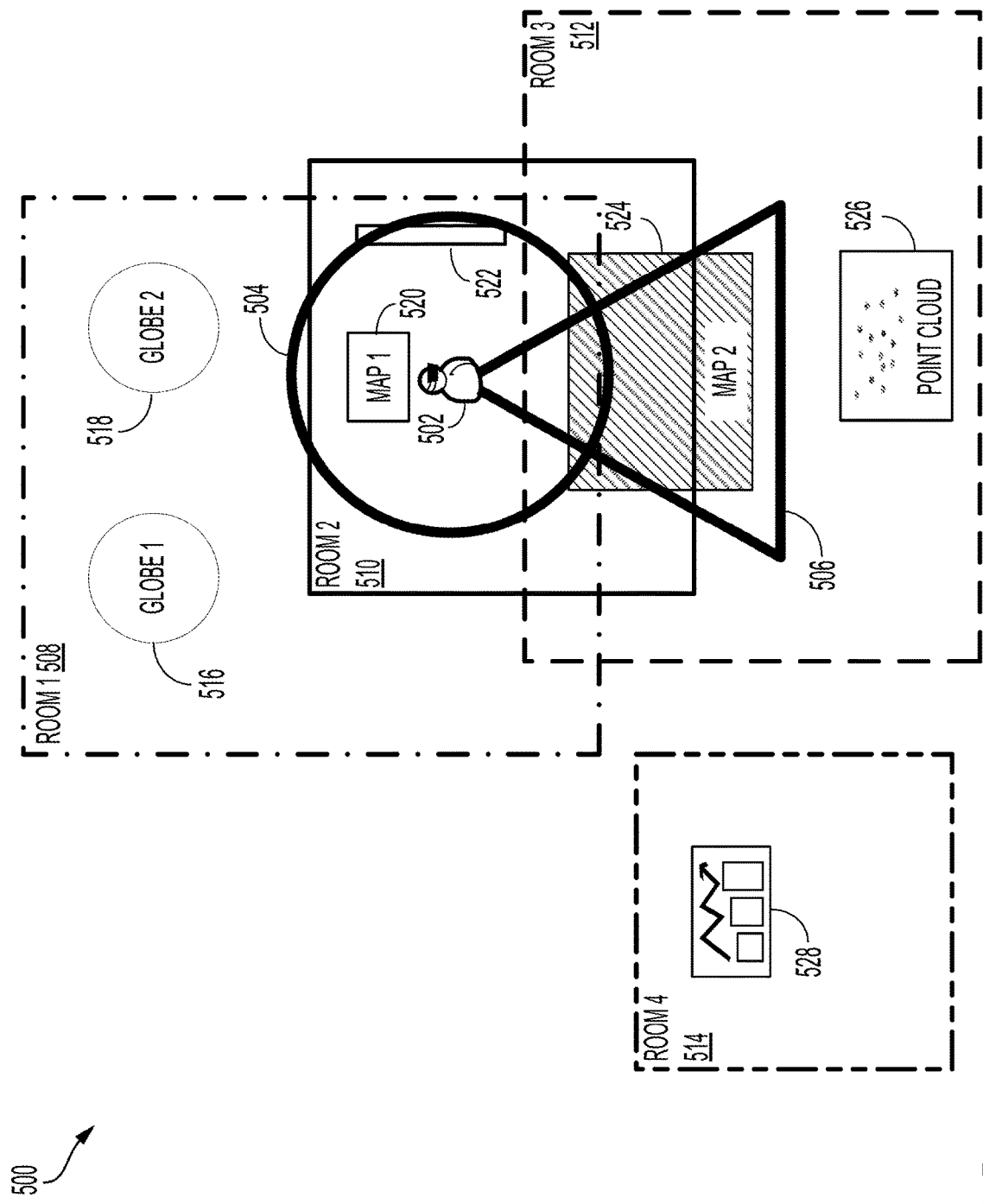
FIG. 5 shows an illustrative example of an environment in which elements within one or more virtual three-dimensional rooms are presented within a virtual three-dimensional environment of a user based on the user's spatial position and field of view in accordance with at least one embodiment.

FIG. 5 shows an illustrative example of an environment 500 in which elements within one or more virtual three-dimensional rooms 508-514 are presented within a virtual three-dimensional environment of a user 502 based on the user's spatial position 504 and field of view 506 in accordance with at least one embodiment. As illustrated in FIG. 5, a user 502 may have virtual three-dimensional rooms 508-514 open in their virtual three-dimensional environment. The user 502 may position virtual three-dimensional rooms within its virtual three-dimensional environment such that certain virtual three-dimensional rooms have overlapping boundaries within the environment. For example, as illustrated in FIG. 5, virtual three-dimensional rooms 508-512 may have overlapping boundaries within the user's virtual three-dimensional environment. Further, when a user 502 is present within a virtual three-dimensional room, the virtual three-dimensional room is deemed to be in an active state. Thus, as illustrated in FIG. 5, because the user 502 is within the boundaries of virtual three-dimensional rooms 508-512, these rooms may be in an active state. However, since the user 502 is not present within the boundaries of virtual three-dimensional room 514, this particular virtual three-dimensional room may be in an inactive state.

While being present in virtual three-dimensional rooms 508-512, the user 502 may interact with any users in these rooms and interact with data present in these rooms (subject to any applicable permissions). Further, the interactable elements for virtual three-dimensional rooms 508-512 may be loaded in memory and utilizing processor capabilities of the user's client.

As illustrated in FIG. 5, the user 502 may be facing virtual three-dimensional rooms 512 based on its field of view 506. This may cause an interactable element for the map element 524 to be loaded and displayed to the user 502. Further, the map element 520 and panel element 522 may be within the user's spatial vicinity 504. This may cause the interactable elements associated with the map element 520 and the panel element 522 to be loaded accordingly.

In an embodiment, elements that are outside of the user's field of view 524 and spatial vicinity 504 are not loaded. For instance, globes 516-518 in virtual three-dimensional room 508 may not have interactable elements loaded as the globes 516-518 are neither within the user's field of view 506 or spatial vicinity 504. However, if the user 502 moves towards globes 516-518 such that globes 516-518 are either within the spatial vicinity 504 or field of view 506 of the user 502, the interactable elements corresponding to globes 516-518 may be loaded on to the user's client. Similarly, if a different user and/or plugin moves the globes 516-518 to be within either the spatial vicinity 504 or field of view 506 of the user 502, the interactable elements corresponding to globes 516-518 may be loaded on to the user's client. As another example, the point cloud 526 within virtual three-dimensional room 512 may also not be within the spatial vicinity 504 or field of view 506 of the user 502. As such, the interactable elements corresponding to the point cloud 526 may not be loaded on to the user's client. This may allow for dynamic, realtime management of Document Object Model (DOM) visual resources.

As noted above and illustrated in FIG. 5, the user 502 is not within the boundaries of virtual three-dimensional room 514, resulting in the virtual three-dimensional room 514 being in an inactive state. On the user's client, this virtual three-dimensional room 514 may consume no resources as element data associated with the virtual three-dimensional room 514 are not loaded due to its inactive state. Further, the user 502 is not included in the list of active users for virtual three-dimensional room 514. The user 502, however, may change this at any time by manually overriding the room's activity, moving its avatar to be within the boundaries of the virtual three-dimensional room 514, or moving the position of the virtual three-dimensional room 514 within the user's environment such that the avatar of the user 502 is within the boundaries of the virtual three-dimensional room 514.

Figure 6A:
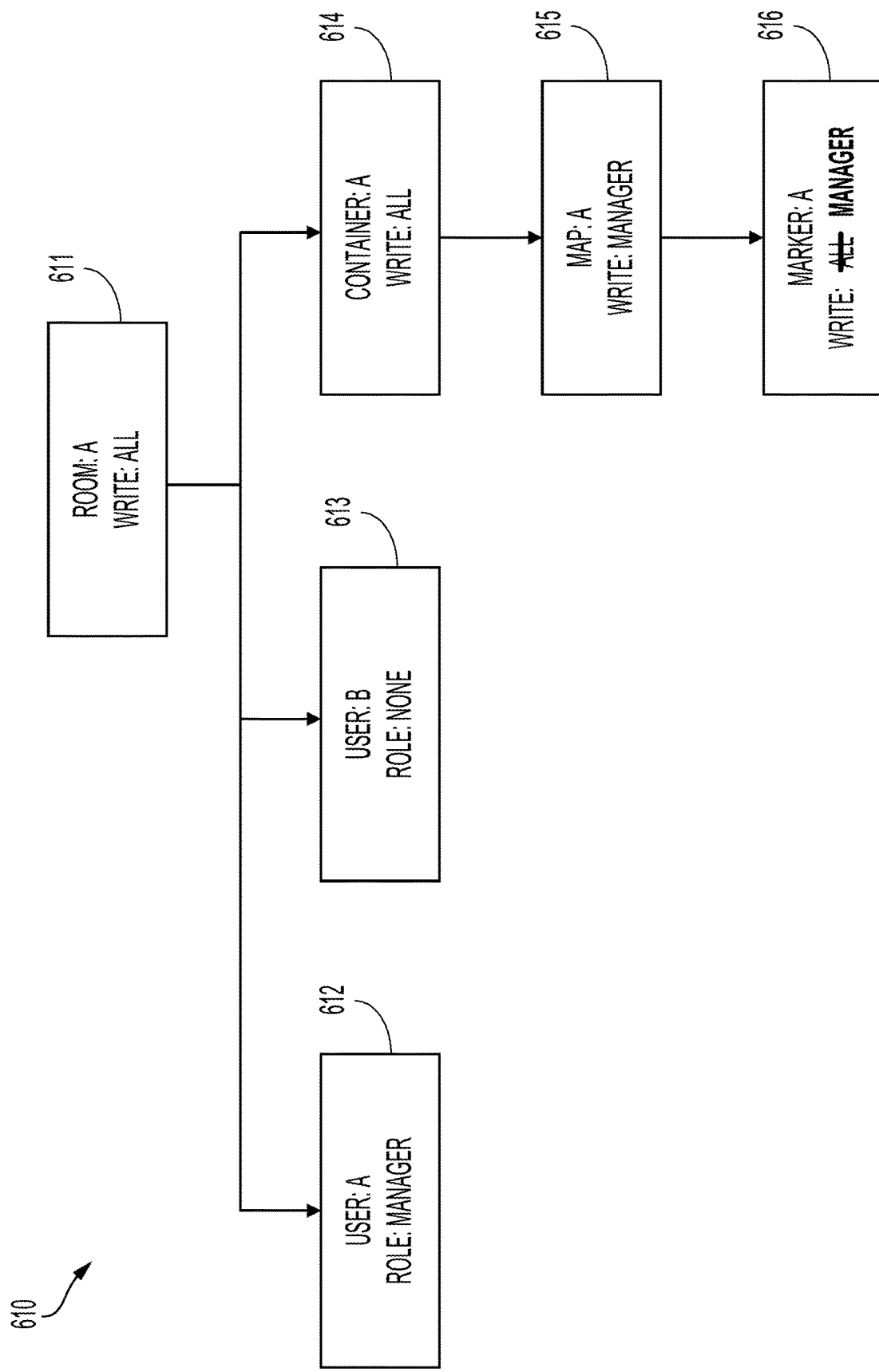
FIG. 6A-6C show illustrative examples of permissions hierarchies for virtual three-dimensional rooms and corresponding elements in accordance with at least one embodiment.
Figure 6B:
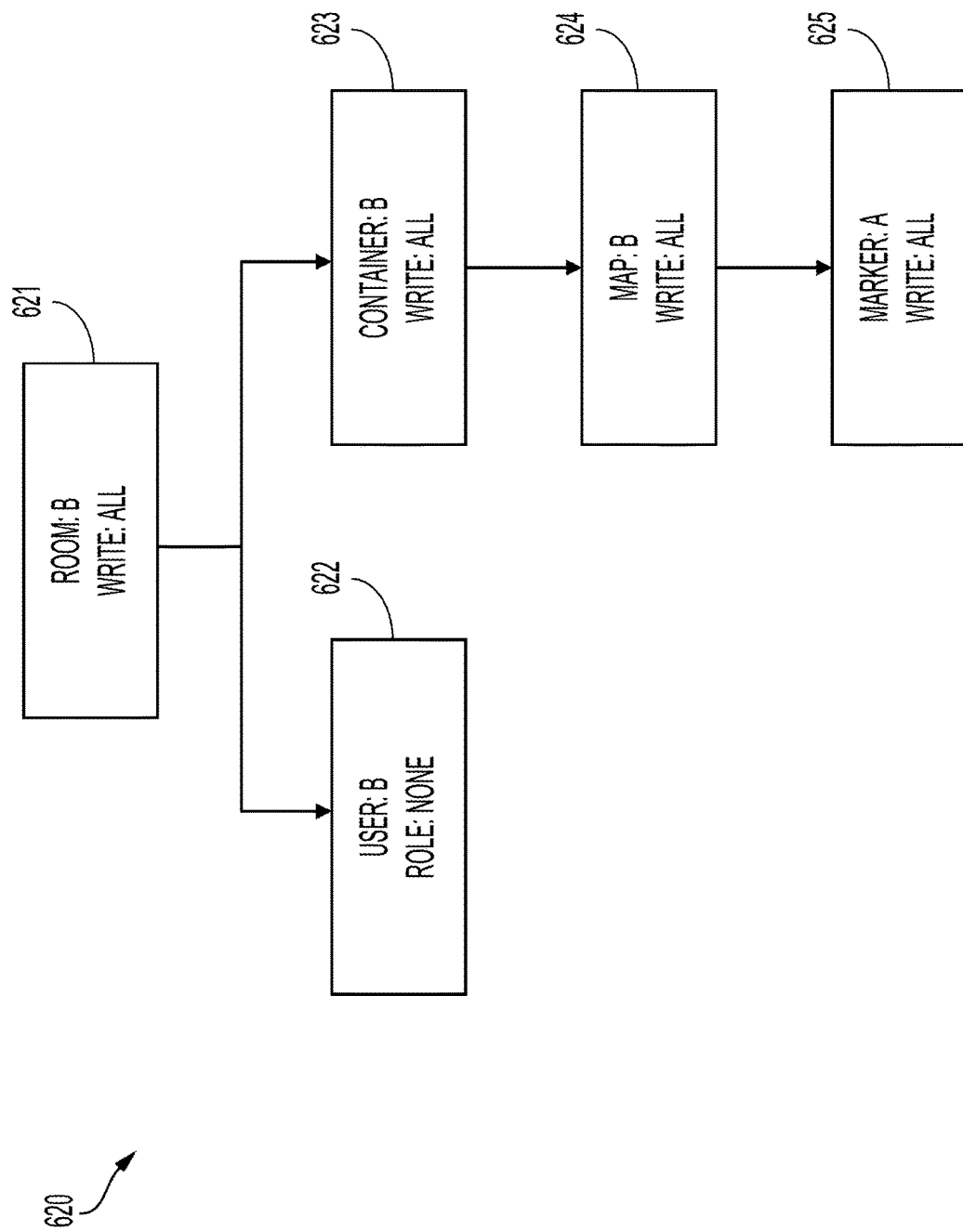
Figure 6C:
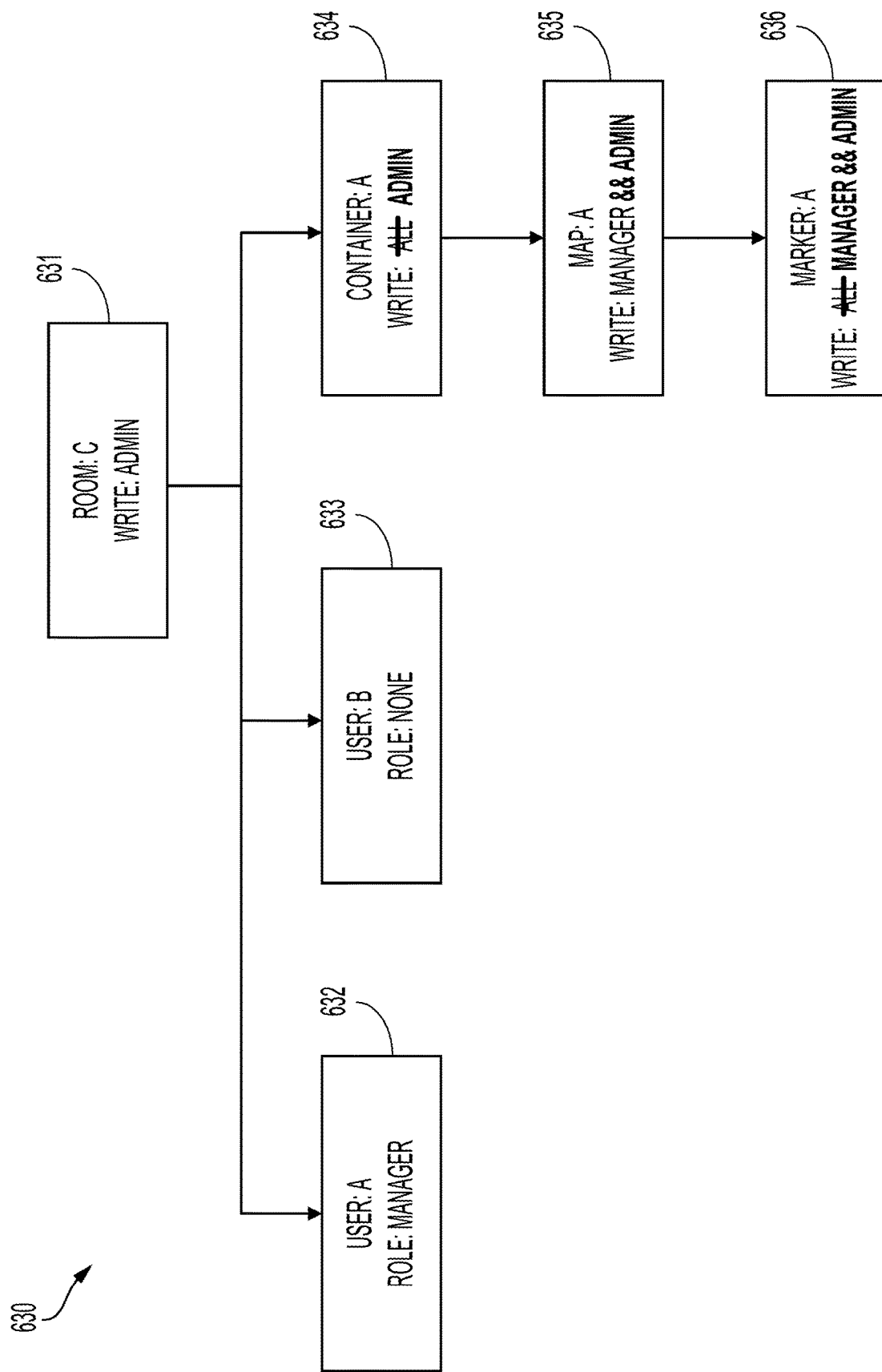

FIG. 6A-6C show illustrative examples of permissions hierarchies for virtual three-dimensional rooms and corresponding elements in accordance with at least one embodiment. In an embodiment, the collaborative virtual environment service allows for various levels of data to be ingested, shared, and modified through the use of interactable elements within a virtual three-dimensional environment. However, there may be instances where this data is sensitive and only a subset, or none, of this data (or capabilities associated with this data) should be available except for particular stakeholders. Thus, in an embodiment, each interactable element can be configured with one or more different types of collections that can be used to manage access to the underlying data and capabilities of the interactable element. These collections may include read access, write access, and share access.

Read access may be used to determine whether a user or plugin is able to view the associated interactable element. In some instances, read access may serve as a catch-all to all permissions. For instance, if a user does not have read access, the user will also not have write or share access. In an embodiment, a note on read access is sent over the network to users who do not have at least read access. This may protect a user from untrusted users or untrusted plugins. In some instances, read access may be freely adjusted. If a user has read access revoked, a final update may be sent by the server notifying the client to remove the interactable element. In doing so, no trace is left in memory of the data and also subsequent updated will not be received.

Write access may be used to determine whether a user or plugin is able to mutate the associated interactable element. In order for a user to actually mutate data, the user may be required to have both read and write access.

Share access may be used to determine whether a user or plugin is able to change the access permissions of read, write, or share access. This may be the most critical type of access as it can mutate the access type of reading, writing, or sharing. In order for a user to change the access permissions, the user may be required to have read, write, and share access for the particular interactable element.

In an embodiment, the collaborative virtual environment service allows users to manage access to interactable element according to various access types for each interactable element. For instance, a user may define access to a particular interactable element to certain session identifiers in a virtual three-dimensional room. Session identifiers are the backing value of a user_element or plugin has to determine their authorization. Utilizing a session identifier for sharing allows users to share their desktop or other resources to only individual users, talk to individual users, share only with a single plugin, and the like.

The collaborative virtual environment service may also allow organizations to define their own custom roles for a deployment of a virtual three-dimensional environment that matches their internal organizational structure. A particular role may be associated with a group of users, as defined by an organization, such that by sharing to a particular role, elements can be shared to the group of users that have the matching role in their user profile that is provided by a backing account server. Roles may be inheritable structures allowing organizations to define roles within roles. For instance, if a user is assigned a role that is a subset of the defined role on an interactable element, the user will be granted access to the interactable element.

The collaborative virtual environment service may further allow organizations and users to provide permissions-based access to interactable elements. Permissions are a generic structure to define access in accordance with data types. As opposed to specifying roles to group user and plugin access, permissions can be defined. For instance, permissions may be set on particular roles or users. Permissions may be contextually aware of the data itself and can more accurately describe the corresponding restriction. For example, a permission having the string "Contractor" can be defined and assigned to all users that are contractors. As another example, the permission "Foxtrot 2 Demo-8 Mission" could be assigned to the role "Bombers," the role "Foxtrot 2 Demo-8 Team," the role "Complex 99 Staff," and user "AJudge."

Similar to permission-based access, access may be managed using plugin permissions, wherein plugin permissions are explicitly grouped to a particular plugin identifier. This may be used for releasing a plugin across a wide domain of organizations. Rather than being defined by an organization, these permissions may be created by the plugins that are stored on the server. For instance, a plugin called "All_Rise" may have the unique identifier "com.bombers.allrise" and define the permissions "dingers" and "sabermetricstats." These permissions may be assed to a user or role by designating "com.bombers.allrise.dingers" and "com.bombers.allrise.sabermetricstats."

In an embodiment, read, write, and share access is an inherited intersection of access in the context of a virtual three-dimensional room's data tree hierarchy. Access resolution requires a user to be included in the set of access at each level of the data tree hierarchy. Thus, each level of the data tree hierarchy serves as an "OR" operation for access and inheritance is an "AND" operation for access.

In an illustrative example, in FIG. 6A, a permission hierarchy 610 for a virtual three-dimensional room, "Room: A," is presented. The virtual three-dimensional room, "Room: A," is initiated having permissions 611 of "Write: All." This denotes that all users have write access within the virtual three-dimensional room. A first user, "User: A" is assigned the role 612 of "Manager" and a second user, "User: B," is assigned the role 613 "None" (e.g., the second user is not assigned a role). Further, a container, "Container: A," may be initiated in the virtual three-dimensional room having permissions 614 of "Write: All." This denotes that all users in the room may have write access to the container. The permissions 614 may be explicitly defined for the container by an administrator or user responsible for the container. Alternatively, the permissions 614 may be inherited from the permissions 611 for the virtual three-dimensional room.

The container within the virtual three-dimensional room may further include a map, "Map: A," that is loaded into the virtual three-dimensional room. The map may have a permission 615 that restricts write access to the role "Manager." Thus, only users having the role "Manager" (e.g., User: A) may be authorized to perform write operations on this particular map. If the map includes a marker, "Marker: A," that has a permission 616 initially set to "Write: All," the marker may inherit the more restrictive permission of the map, thereby changing the permission 616 from "Write: All" to "Write: Manager." This may result in a restriction whereby only users with the role "Manager" can modify the marker within the virtual three-dimensional room.

As illustrated in FIG. 6B, a permission hierarchy 620 for another virtual three-dimensional room, "Room: B," is presented. The marker, "Marker: A," is loaded into this virtual three-dimensional room. Similar to the virtual three-dimensional room referenced in FIG. 6A, the virtual three-dimensional room, "Room: B," is initiated having permissions 621 of "Write: All." This denotes that all users have write access within the virtual three-dimensional room. A user within this virtual three-dimensional room, "User: B," is assigned the role 622 "None" (e.g., the second user is not assigned a role). Further, a container within the room, "Container: B," is initiated in the virtual three-dimensional room having permissions 623 of "Write: All."

The container within this virtual three-dimensional room may further include a map, "Map: B," that is loaded into the virtual three-dimensional room with permissions 624 of "Write: All." This allows any user within the virtual three-dimensional room to write to the map. Since the map does not have any write restrictions, as opposed to the "Map: A" demonstrated in FIG. 6A, the marker, "Marker: A" does not inherit any restrictions from "Map: B." As a result, any user who is able to join this virtual three-dimensional room may be authorized to modify the marker. This means that while the user, "User: B," was not able to modify the marker while in "Room: A," it is able to modify the marker in "Room: B." To prevent the user from being able to modify the marker in either room, a permission for the marker itself may be defined whereby the marker may only be modified by users having the role "Manager," as described above.

As illustrated in FIG. 6C, a permission hierarchy 630 is presented for another virtual three-dimensional room, "Room: C," is presented. This virtual three-dimension room may have permissions 631 of "Write: Admin," whereby only users having an administrative role are granted write access within the room. When the first user, "User: A," and the second user, "User: B," enter this room, neither of them can change any content because they are not part of the administrative role. For instance, the first user has a role 632 of "Manager," whereas the second user has a role 633 of "None." The container, "Container: A," that has a permission 634 initially set to "Write: All," may inherit the more restrictive permission 631 of the room, thereby changing the permission 634 from "Write: All" to "Write: Admin." Further, the map, "Map: A," that has a permission 635 initially set to "Write: Manager," may inherit the "Write: Admin" permission of the room, thereby changing the permission 635 to require a user to have both the "Manager" and "Admin" roles. This may prevent the first user, "User: A," from modifying the map within this virtual three-dimensional room. Further, the marker, "Marker: A," that has a permission 636 initially set to "Write: All," may also inherit the "Write: Manager&&Admin" permission of the map. Thus, neither user may change any content because they are not part of the administrative role. These intricacies with accessing content within a virtual three-dimensional environment may thus require administrators and other content owners to explicitly define access on a per element basis.

Figure 7:
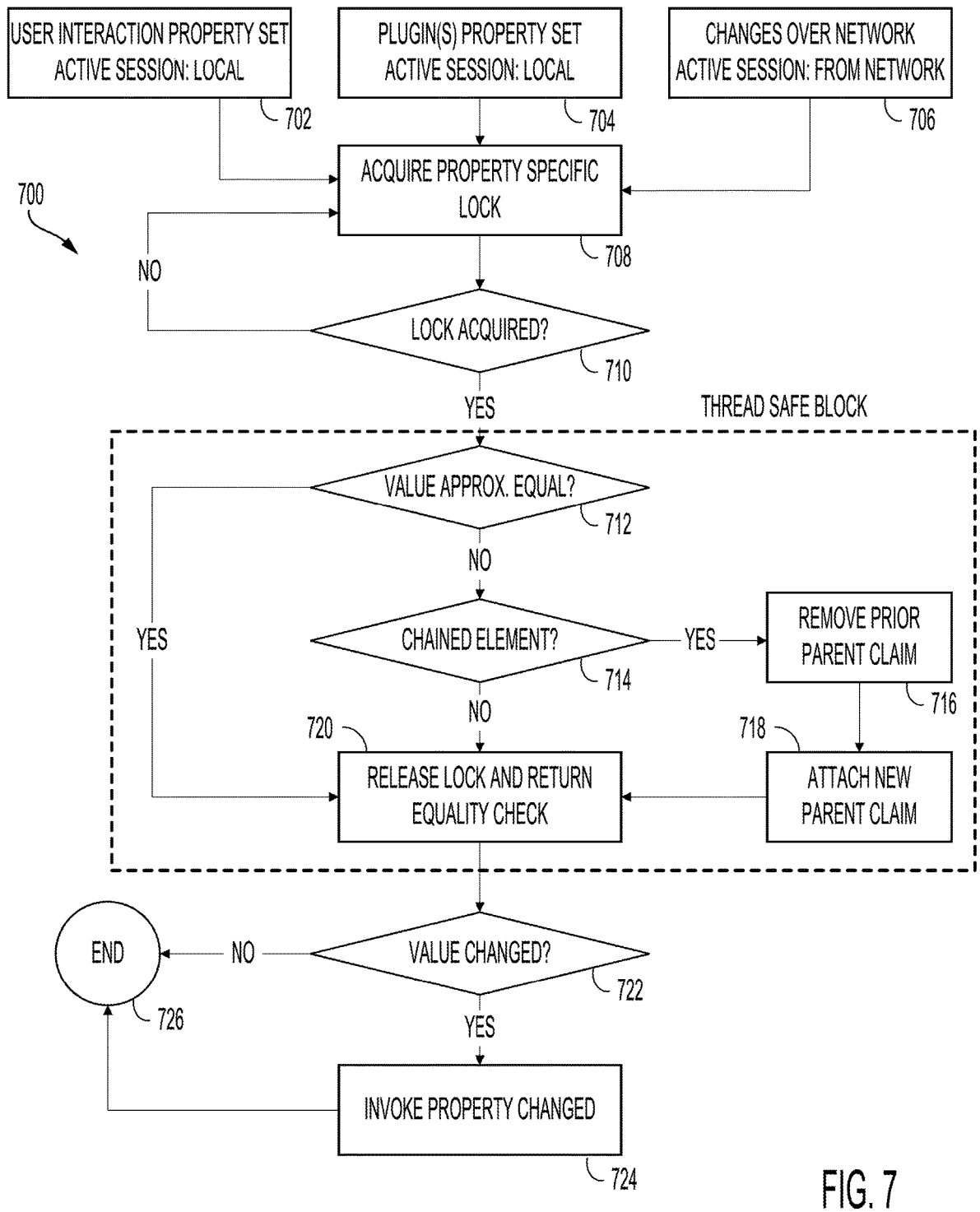
FIG. 7 shows an illustrative example of a process for propagating property changes for elements to other users in a virtual three-dimensional room in accordance with at least one embodiment.

FIG. 7 shows an illustrative example of a process 700 for propagating property changes for elements to other users in a virtual three-dimensional room in accordance with at least one embodiment. In an embodiment, every property on an element propagates through the same system to determine whether to fire property changes. This may be performed to discard any superfluous changes that plugins, the client, or the network send to the user. For instance, in response to a property being set as a result of changes from a client, a plugin, or received over the network (steps 702-706, respectively), the system may attempt to acquire, from the operating system, a property specific lock at step 708. The property specific lock may be a mutual exclusion lock that guarantees only one thread/core can interact with the locked content at a given time. At step 710, the system determines whether the lock has been acquired. If the lock has not been acquired, the system may continue to attempt acquisition of the property specific lock.

In an embodiment, if the system obtains the property specific lock, the system determines whether the value of the property change is approximately equal to a previous property value at step 712. If the system determines that the value is not approximately equal to a previous property value, the system determines whether the corresponding element is a chained element at step 714. If so, the system may remove the prior parent claim at step 716 and attach a new parent claim at step 718. Further, once the new parent claim has been attached, the system may release the property specific lock and return an equality check at step 720. In some instances, the system may perform the step 720 if the property value is approximately equal to the previous property value or if the corresponding element is not a chained element.

Once the lock has been released, the system may determine whether the property value has changed at step 722. If the value has not changed, the process 700 terminates at step 726. However, if the system determines that the property value has changes, the system may invoke the property changed process at step 724. As an illustrative example, if an element property is set to a new value on a position object that is included on a user's avatar, the equality check may only allow the change if it is visually noticeable. For geolocation changes on a marker, if the value changes at all, the change may be sent, as this data may be more sensitive in nature. This allows the sensitivity to property changes to be adjusted based on the context of the property.

Figure 8:
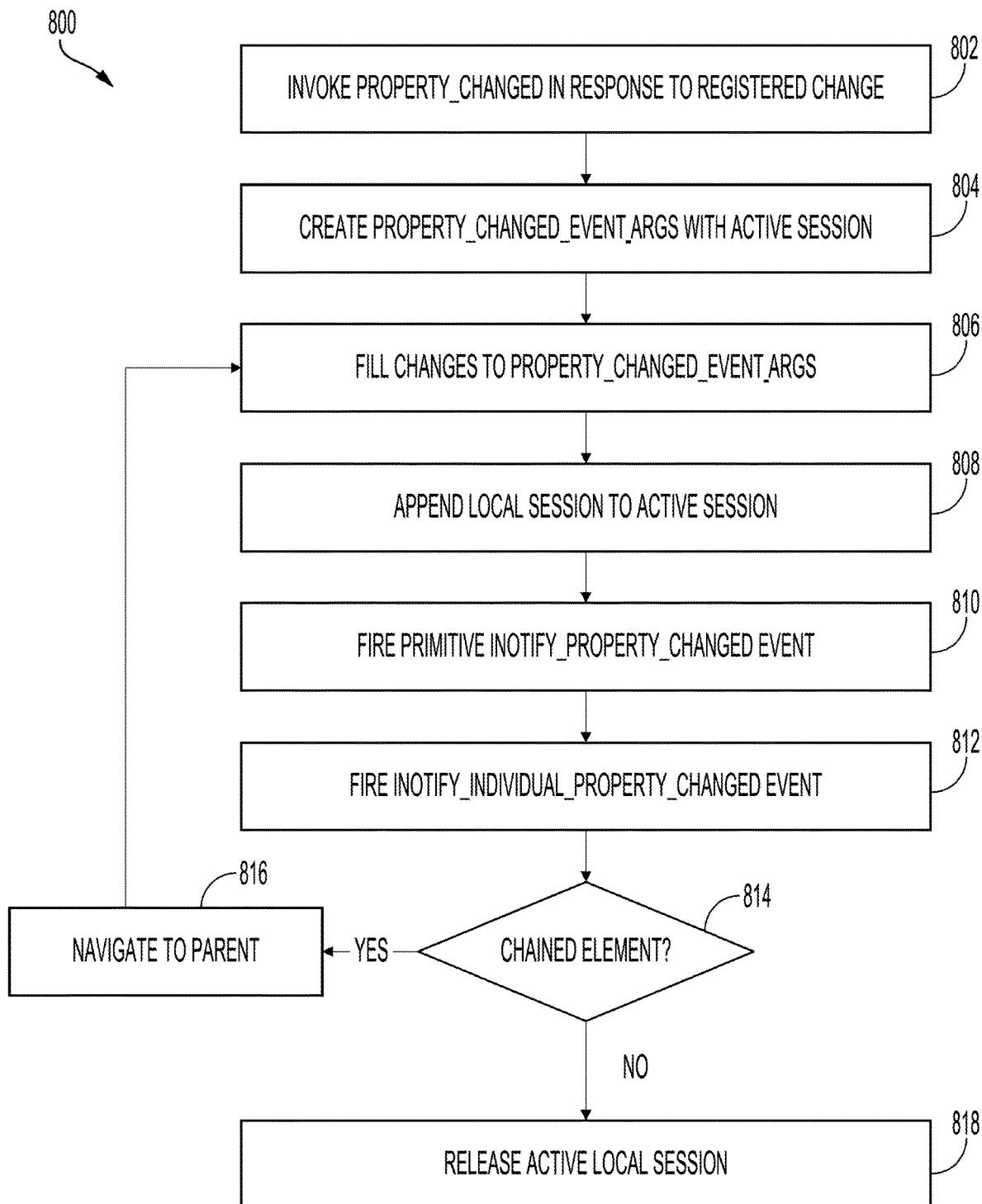
FIG. 8 shows an illustrative example of a process for aggregating change information associated with a property change to relay the property change to all recipients in accordance with at least one embodiment.

FIG. 8 shows an illustrative example of a process 800 for aggregating change information associated with a property change to relay the property change to all recipients in accordance with at least one embodiment. When a property change is officially registered, the change information associated with the property change is aggregated in order to relay the property change to all recipients. This invocation of property_changed in response to a registered change may be performed at step 802 based on the outcome of the process 700 described above. For instance, if the aforementioned system determines that a property value has changed, the system may invoke the property_changed process 800.

At step 804, the property_changed_event_args are created with the active session. Every thread that instigates a change may have an underlying session handler. This session may be used to register who caused a particular property change to occur. This information may be used by an element change service to determine whether a change needs to be propagated over the network. Further, this information may be used for auditing a virtual three-dimensional room and for applying particular changes based on the user or plugin instigating the change. Plugins may also be given this information when network changes occur.

At step 806, the changes to the property_changed_event_args are filled. Properties may recursively propagate their changes up until they reach the root of an interactable element. The element change service may only listen to root operation changes on interactable elements. A mechanism (e.g., property_node) may aggregate a tree of all properties that have changed. This mechanism may allow determination of what data actually needs to be relayed over the network while allowing plugins to focus at different levels of abstraction.

At step 808, the local session is appended to the active session. At step 810, a primitive INotify_Property_Changed_Event may be fired. Further, at step 812, an INotify_Individual_Property_Changed is fired. This allows for the addition or removal of listeners to the particular properties that are to be listened to for the detection and implementation of changes.

At step 814, it is determined whether the corresponding element is a chained element. If the element is a chained element, the process 800 continues with navigation to the parent at step 816 and fills changes to the property_changed_event_args of the parent at step 806. However, if the element is not a chained element, the active local session is released at step 818. The appending of the local session to the active session and the release of the active local session are used to stack on top of the current session such that any subsequent property changes occurring from property changes are captured as the correct session instigating them.

Figure 9:
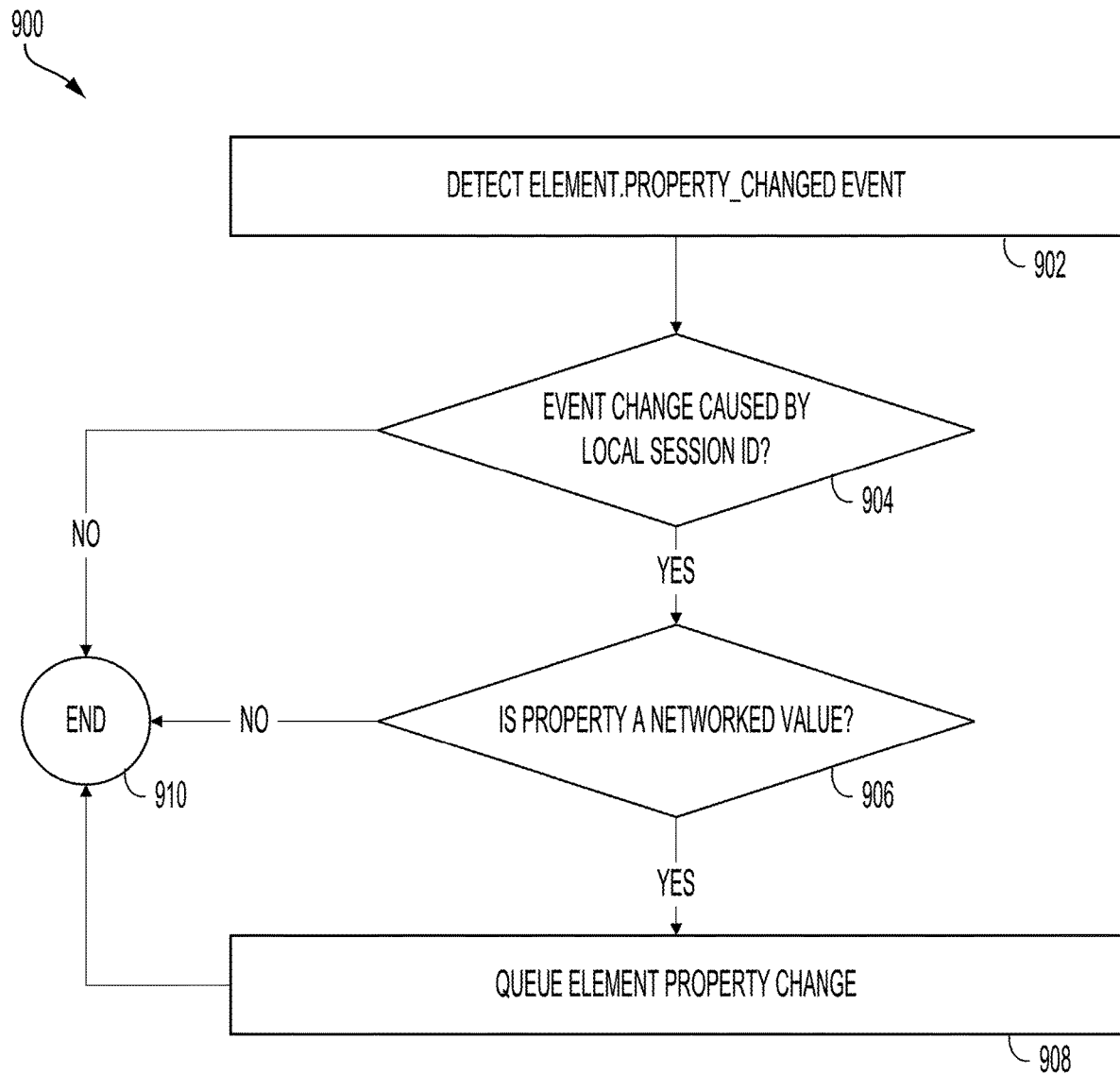
FIG. 9 shows an illustrative example of a process for handling changes to an element for propagation over a network in accordance with at least one embodiment.

FIG. 9 shows an illustrative example of a process 900 for handling changes to an element for propagation over a network in accordance with at least one embodiment. The process 900 may be performed by an element property change service, which may handle listening to all changes that occur across all elements to determine whether to propagate these changes over the network. At step 902, the element property change service may detect an element.property_changed event. This event may result from the steps described above in connection with FIGS. 7-8.

At step 904, the element property change service may determine whether the event change caused by a local session identifier. For instance, changes that are to be propagated may be required to have been caused by the local machine (e.g., the local session identifier). Thus, if the event change was not caused by the local session identifier, the process 900 ends at step 910. However, if the event change was caused by a local session identifier, the element property change service may determine, at step 906, whether the property is annotated as a networked property.

If the property is not annotated as a networked property, the process 900 may end at step 910. However, if the property is annotated as a networked property, the element property change service may queue the element property change at step 908. It should be noted that in some instances, even if an element property change is queued, there is the possibility that the element property change may not be propagated. For instance, if a collection add or remove supersedes the element property change, the element property change may not be propagated.

Figure 10:
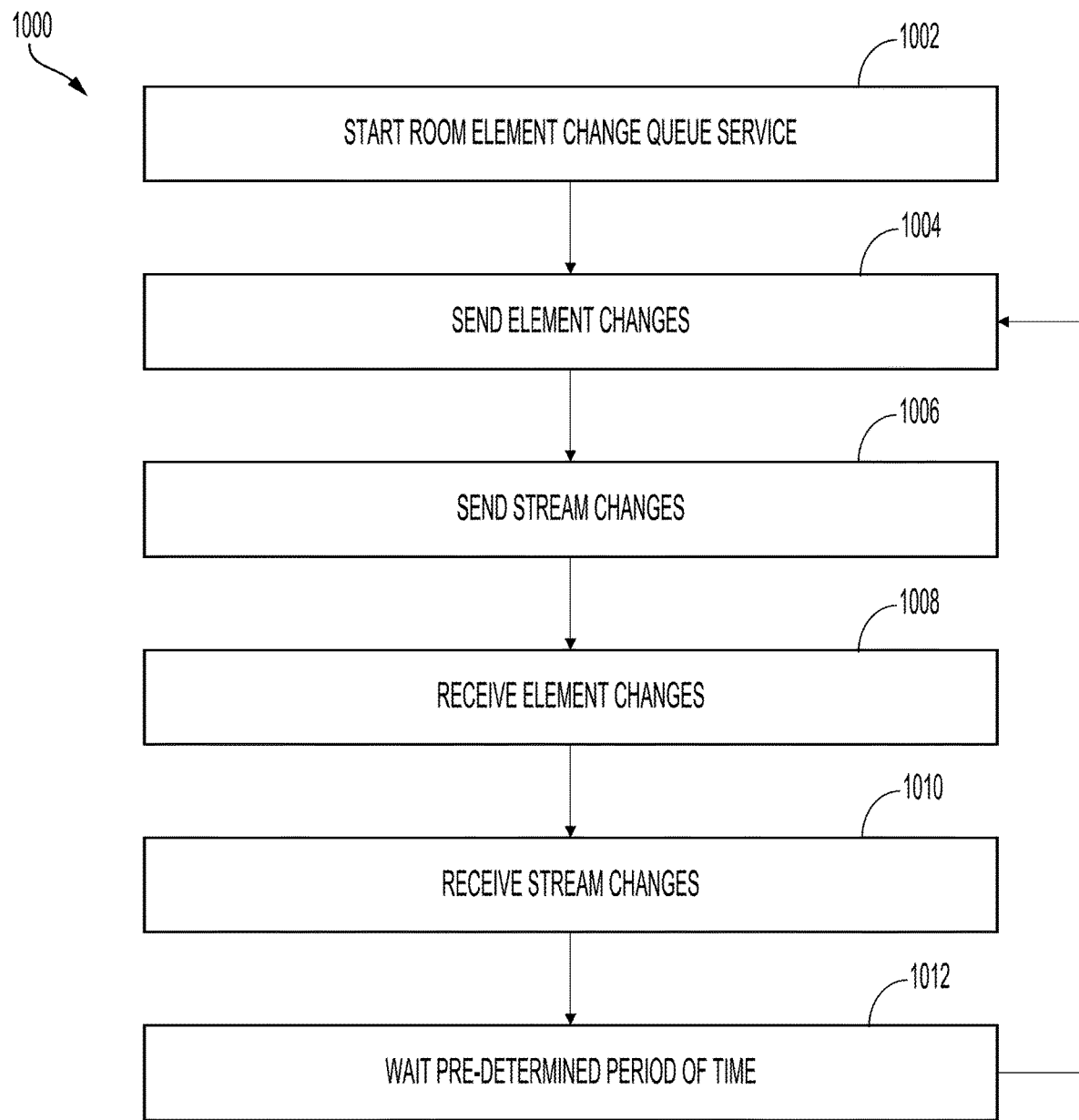
FIG. 10 shows an illustrative example of a process for cycling sending and receiving element changes in accordance with at least one embodiment.

FIG. 10 shows an illustrative example of a process 1000 for cycling sending and receiving element changes in accordance with at least one embodiment. The process 1000 may be performed by an element change queue service, which may be started at step 1002. The element change queue service may send element changes that have occurred over the network at step 1004. Further, the element change queue service, at step 1006, may send stream changes that have occurred over the network.

At steps 1008 and 1010, the element change queue service may receive element changes and stream changes, respectively. Upon receiving these changes, the element change queue service, at step 1012, may wait a pre-determined period of time before sending these element changes and stream changes over the network. This may allow for these changes to be aggregated and to be sent in bulk. Further, this may allow for the element change queue service to obtain any element changes and stream changes in bulk, as well.

Figure 11:
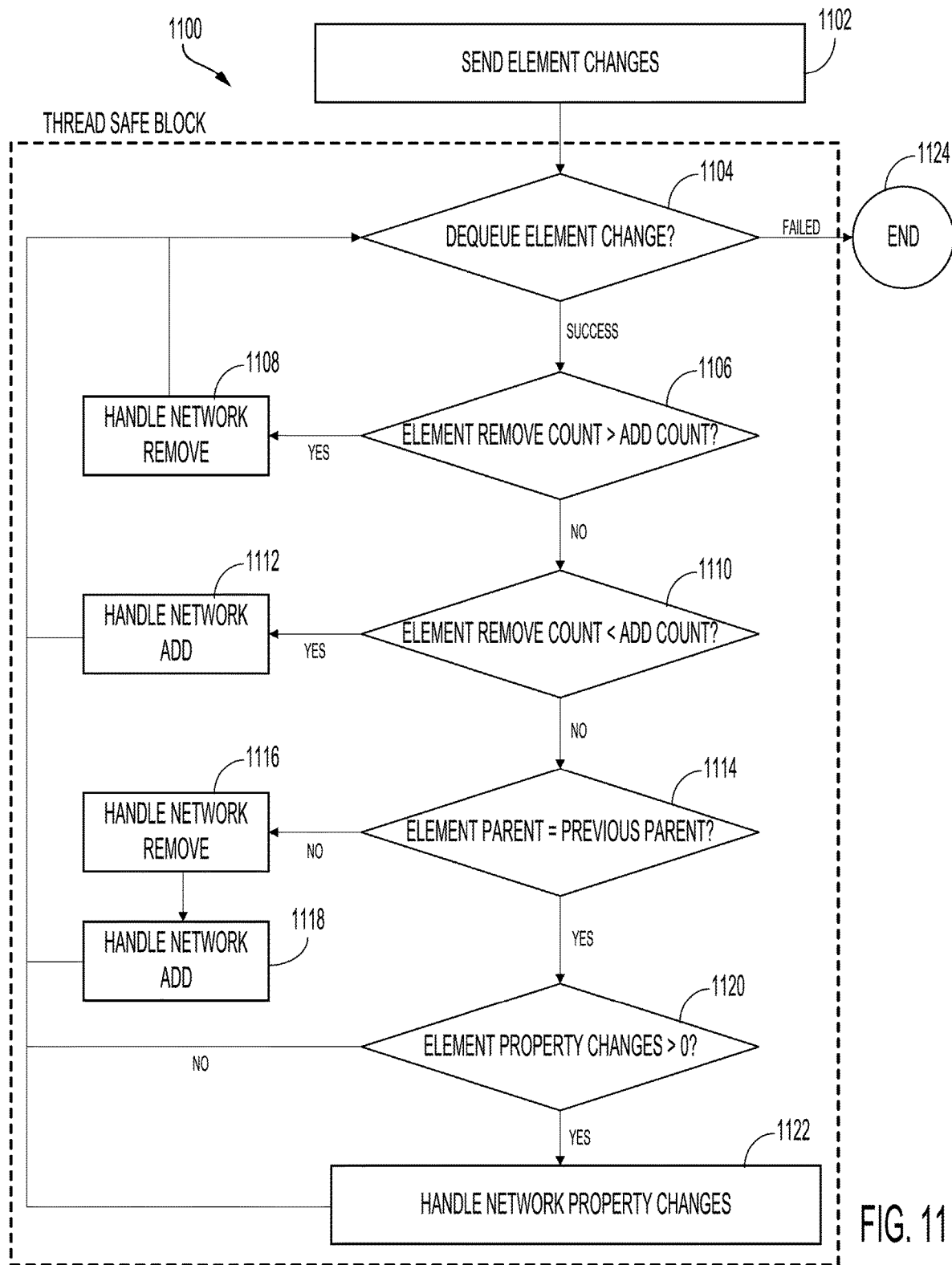
FIG. 11 shows an illustrative example of a process for sending element changes to be converted into add, remove, and property change commands for a virtual three-dimensional room in accordance with at least one embodiment.

FIG. 11 shows an illustrative example of a process 1100 for sending element changes to be converted into add, remove, and property change commands for a virtual three-dimensional room in accordance with at least one embodiment. The process 1100 may be performed by a network service of the collaborative virtual environment service. At step 1102, the send element changes process is initiated. For instance, the aforementioned element change queue service may invoke this process as described above. The network service may track all changes and aggregate these into a single message that is transmitted at designated time intervals. These aggregated changes may be turned into add, remove, and property change commands. This allows for the creation of a historical record of how a virtual three-dimensional room was constructed and move to any particular state of the room.

At step 1104, the network server attempts to dequeue an element change. If this operation fails, the process 1100 ends at step 1124. However, if the dequeueing of an element change is successful, the network service determines whether the element remove count is larger than the add count. If the remove count is larger than the add count, the final state of the virtual three-dimensional room at the end of a pre-determined time interval does not include that element when it previously did at the start of the time interval. Thus, if the remove count is greater than the add count, the network service may initiate a network remove process at step 1108.

If the element remove count is not greater than the add count, the network service determines whether the element remove count is less than the add count at step 1110. If the add count is greater than the remove count, this may denote that the virtual three-dimensional room did not include this element at the beginning of the pre-determined time interval but now includes the element. This may cause the network service to initiate a network add process at step 1112.

If the element remove count is not greater than or less than the add count for the element, this may denote that the remove count is equal to the add count for the element. If this is the case, the network service determines, at step 1114, whether the element parent is equal to the previous parent. For instance, the network service may determine whether the parent element is the same from the beginning of the pre-determined time interval to the end of the time interval. If the parent is different, then it is known that the element was moved to a different parent but is still in the virtual three-dimensional room. This may result in the network service initiating a network remove process at step 1116 and a network add process at step 1118 for the element to move the element from the original parent to the different parent.

If the aforementioned checks each fail (e.g., the element remove count is equal to the add count, the element parent is the same as the previous parent), the network service determines whether the element change included any property changes by evaluating at the attached property node at step 1120. If the property node is not null (e.g., element property changes are greater than 0), the network service may send the element property changes to a serialization service for delivery over the network at step 1122. The process 1100 may loop back to step 1104, whereby the network service may again dequeue any new element changes as described above.

Figure 12A:
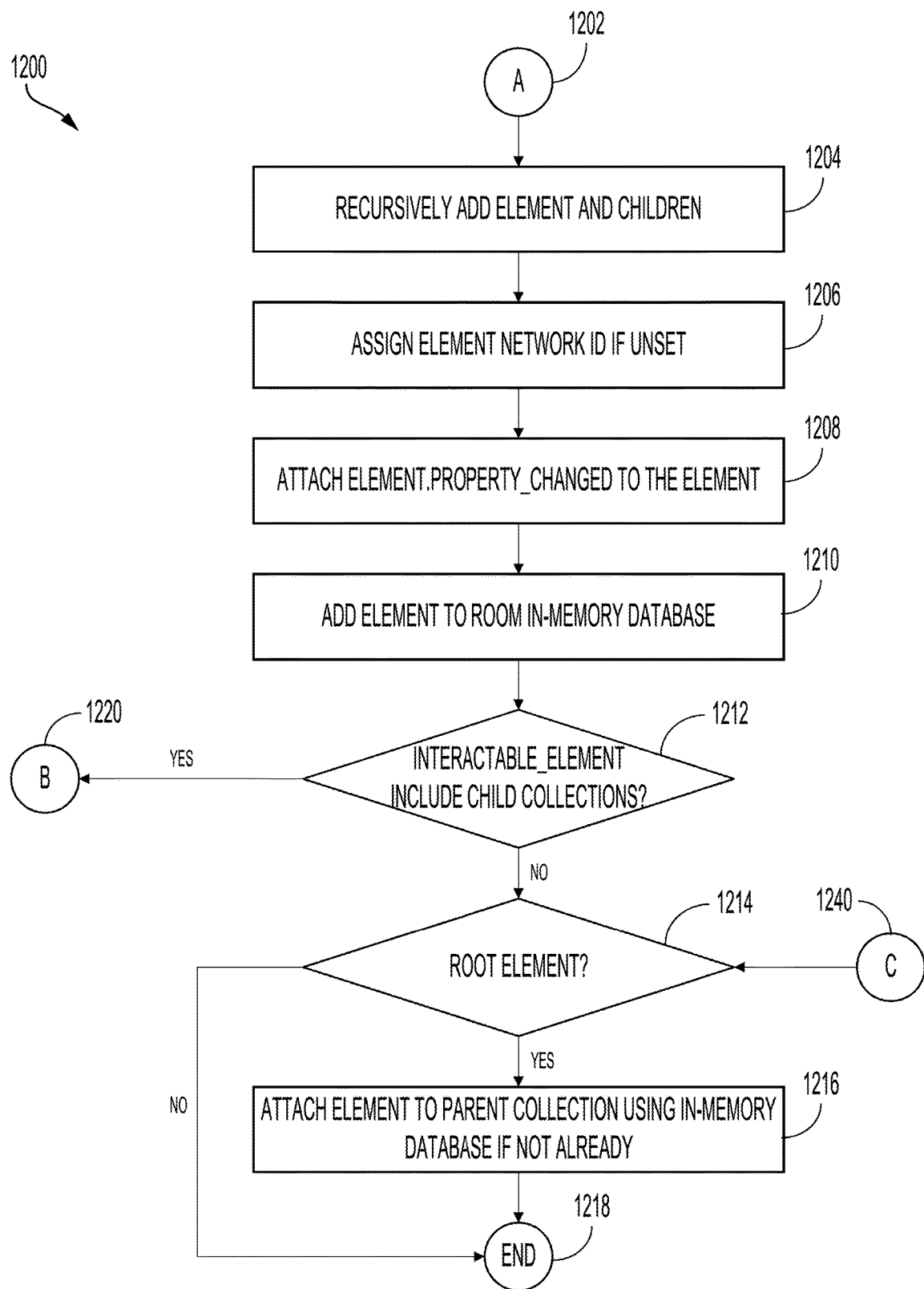
FIGS. 12A-12B show an illustrative example of a process for handling a network add for an element in accordance with at least one embodiment.
Figure 12B:
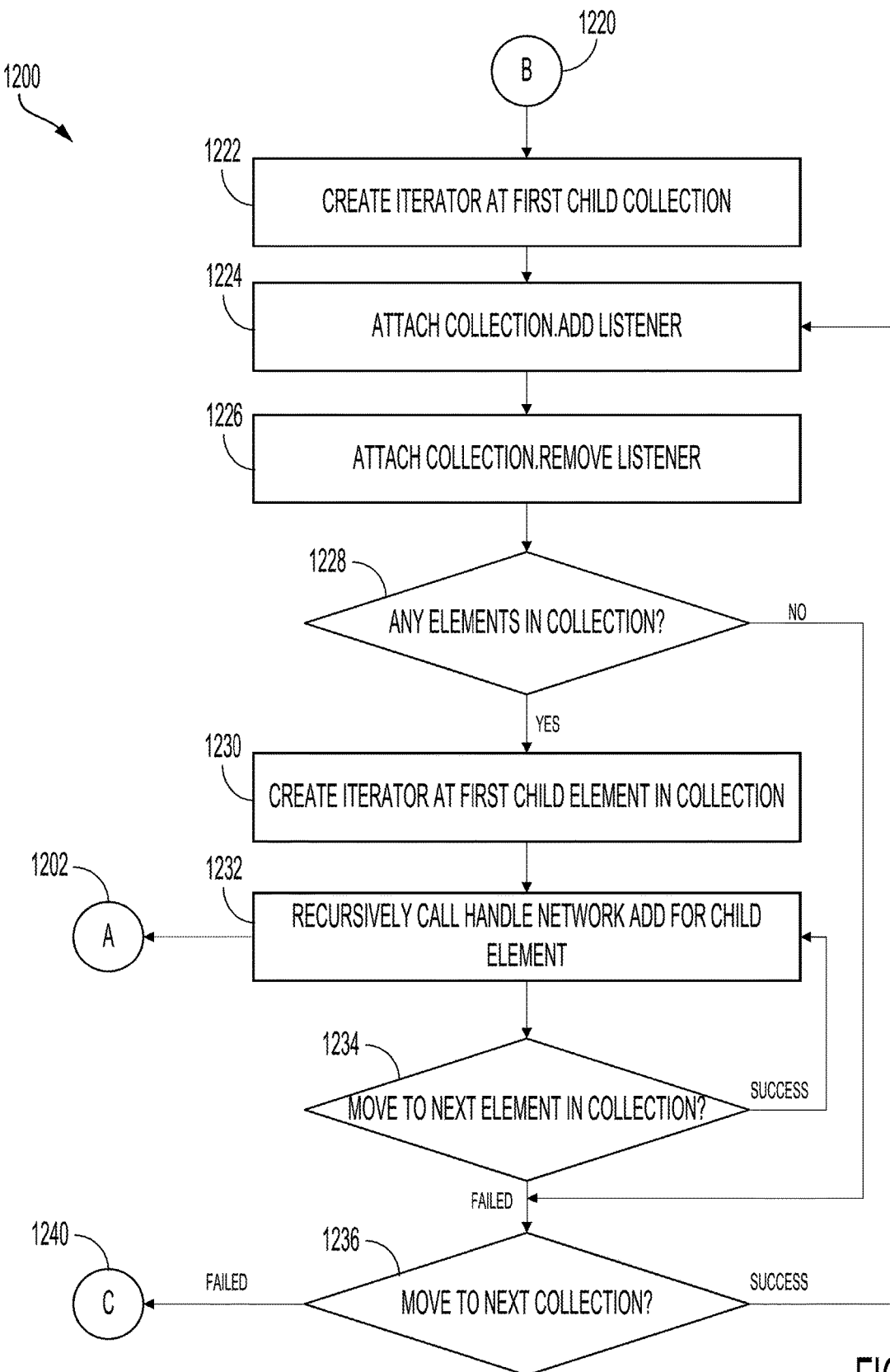

FIGS. 12A-12B show an illustrative example of a process 1200 for handling a network add for an element in accordance with at least one embodiment. As illustrated in FIG. 12A, the process 1200 may be initiated at step 1202. For instance, the process 1200 may be initiated by a network service as a result of a determination that an element has been added to a virtual three-dimensional room during a pre-determined time interval. The process 1200 may also be initiated by the network service as a result of a determination that an element was moved to a different parent but is still in the virtual three-dimensional room.

At step 1204, the element and its children elements are recursively added. Further, at step 1206, an element network identifier is assigned to the element if it is unset. At step 1208, element.property_changed is attached to the element and, at step 1210, the element is added to the in-memory database for the virtual three-dimensional room. At step 1212, it is determined whether the interactable element includes any child collections. If so, the process 1200 continues at step 1220, which is presented in greater detail in FIG. 12B. However, if the interactable element does not include any child collections, the process 1200 continues to step 1214, whereby it is determined whether the element is a root element. If so, the element is attached to the parent collection using the in-memory database at step 1216. After this step, the process ends at step 1218. However, if the element is not a root element, the element is not attached to the parent collection and the process 1200 ends at step 1218.

As illustrated in FIG. 12B, if the interactable element includes any child collections, the process 1200 continues at step 1220 and an iterator is created at the first child collection at step 1222. Additionally, collection.add and collection.remove listeners are attached at steps 1224 and 1226, respectively. At the child collection, it is determined, at step 1228, whether there are any elements in the collection. If so, at step 1230, an iterator is created at the first child element in the collection and, at step 1232, the network add process is recursively called for the child element. This may result in an execution of the process 1200 for the child element, beginning at step 1202.

In addition to recursively calling the network add process for the child element, an attempt is made at step 1234 to move to the next element in the child collection. If this step is successful, the process 1200 may cycle back to step 1232 to recursively call the network add process for this next element. This may continue until the attempt at step 1234 fails, at which point an attempt is made to move to the next child collection at step 1236. If this attempt is successful, the process 1200 cycles back to steps 1224 and 1226, whereby a collection.add listener and a collection.remove listener is attached to this next child collection. The attempt at step 1236 may also be performed if there are no elements in the child collection, thereby bypassing steps 1230-1234. If the attempt to move to the next child collection has failed, the process 1200 may continue to step 1240, which may result in a determination, at step 1214, as to whether the element is a root element (see FIG. 12A).

Figure 13A:
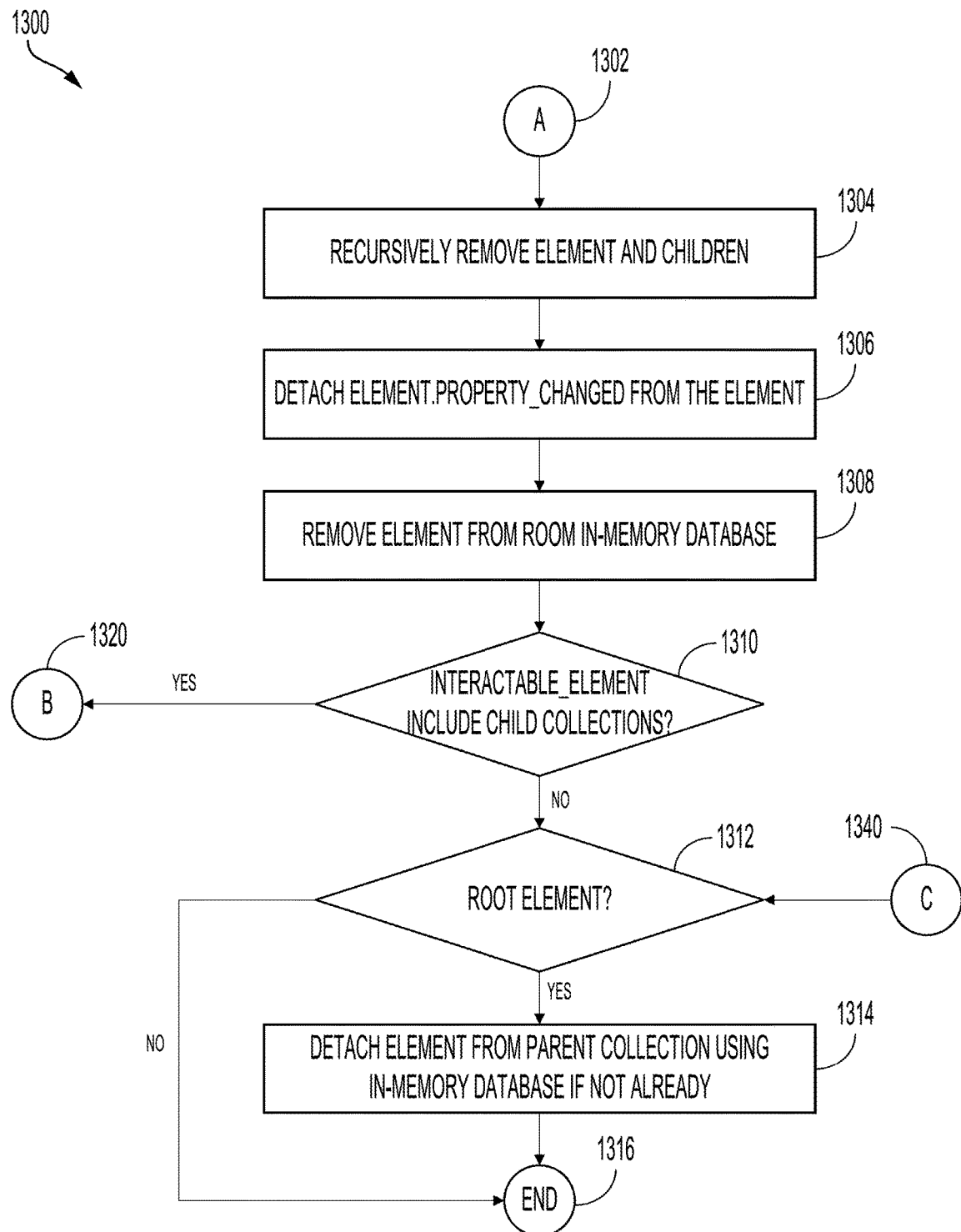
FIGS. 13A-13B show an illustrative example of a process for handling a network remove for an element in accordance with at least one embodiment.
Figure 13B:
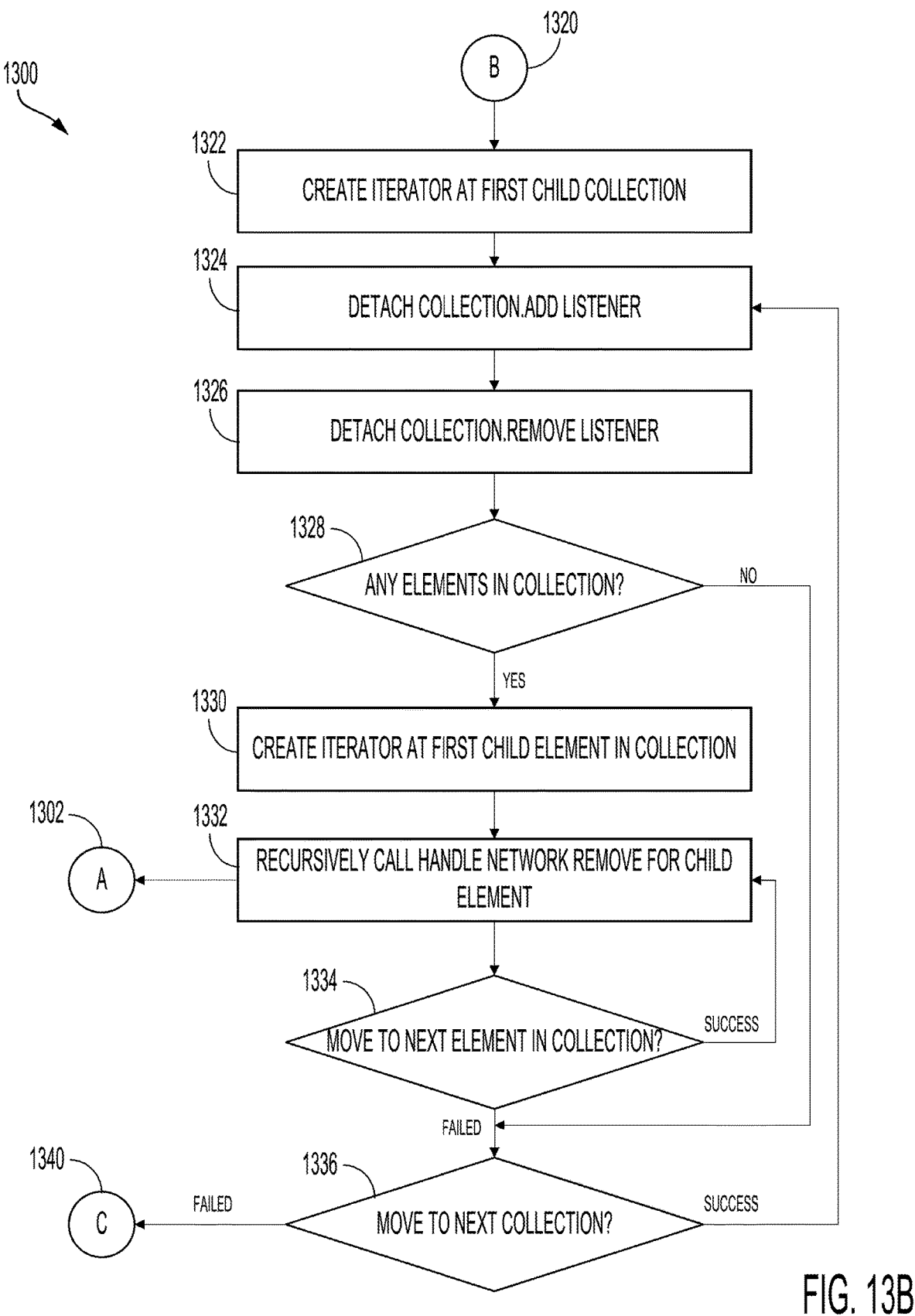

FIGS. 13A-13B show an illustrative example of a process 1300 for handling a network remove for an element in accordance with at least one embodiment. The process 1300 may be similar to the process 1200 described above. However, there are some key differences. For instance, an element's network identifier is not deleted. This is because once a network identifier is assigned to a virtual three-dimensional room, it is guaranteed to be unique in that room. If this element is eventually added back by a user or plugin, the network identifier may be re-used for the element.

As illustrated in FIG. 13A, the process 1300 may be initiated at step 1302. For instance, the process 1300 may be initiated by a network service as a result of a determination that an element has been removed from a virtual three-dimensional room during a pre-determined time interval. The process 1300 may also be initiated by the network service as a result of a determination that an element was moved to a different parent but is still in the virtual three-dimensional room. At step 1304, the element and its children elements are recursively removed. Further, at step 1306, element.property_changed is detached from the element and, at step 1308, the element is removed from the in-memory database for the virtual three-dimensional room.

At step 1310, it is determined whether the interactable element includes any child collections. If so, the process 1300 continues at step 1320, which is presented in greater detail in FIG. 13B. However, if the interactable element does not include any child collections, the process 1300 continues to step 1312, whereby it is determined whether the element is a root element. If so, the element is detached from the parent collection using the in-memory database at step 1314. After this step, the process ends at step 1316. However, if the element is not a root element, the element is not detached from the parent collection and the process 1300 ends at step 1316.

As illustrated in FIG. 13B, if the interactable element includes any child collections, the process 1300 continues at step 1320 and an iterator is created at the first child collection at step 1322. Additionally, collection.add and collection.remove listeners are detached from the collection at steps 1324 and 1326, respectively. At the child collection, it is determined, at step 1328, whether there are any elements in the collection. If so, at step 1330, an iterator is created at the first child element in the collection and, at step 1332, the network remove process is recursively called for the child element. This may result in an execution of the process 1300 for the child element, beginning at step 1302.

In addition to recursively calling the network remove process for the child element, an attempt is made at step 1334 to move to the next element in the child collection. If this step is successful, the process 1300 may cycle back to step 1332 to recursively call the network remove process for this next element. This may continue until the attempt at step 1334 fails, at which point an attempt is made to move to the next child collection at step 1336. If this attempt is successful, the process 1300 cycles back to steps 1324 and 1326, whereby a collection.add listener and a collection.remove listener are detached from this next child collection. The attempt at step 1336 may also be performed if there are no elements in the child collection, thereby bypassing steps 1330-1334. If the attempt to move to the next child collection has failed, the process 1300 may continue to step 1340, which may result in a determination, at step 1314, as to whether the element is a root element (see FIG. 13A).

The detachment from a parent is dependent on whether it is a removal over the network. If it is a network command, then removal of the element from its parent is to be handled. It should be noted that this process is not recursively applied on removal on child elements. This allows the state of the element tree that is being removed to be pruned rather than shredded. Thus, the tree can be detached and subsequently attached elsewhere and preserve its state.

Property changes may be handled by immediately serializing a given element's state, while all changes are aggregated into a single property node that is used for serialization. This may create a micro-snapshot of the element that includes its property changes that are then sent over the network (e.g., if the property node is not null, as described above in connection with FIG. 11). The property node may be used to include a tree representing the aggregate changes that have occurred across a pre-defined time interval incorporated into the element change queue service described above. This tree may include the name of all properties that have changed. Thus, a node may represent an aggregate set of changes. If a node has children (e.g., child properties of a property), it signifies that those were the specific set of properties that changed inside of it. This information may be available for viewing as property changes are propagated upward and fill their corresponding property node of their property_changed_event_args.

The property node tree may be passed down until it reaches the "Send Property Changed Subset Serialized Element" node of "Send Element Changes." The properties that have actually changed are serialized in a generalized fashion. Once a leaf property node is reached, the entire object is serialized.

In an embodiment, the collaborative virtual environment service provides support for element components and interactable components, which allow properties to be dynamically listened to in a clear and concise manner by attaching components to a given element or interactable item. This may be driven by the aforementioned property_changed attribute described above in connection with FIGS. 7-10 and 14. Thus, the collaborative virtual environment service may manage superfluous changes and delegates to the correct threads to delegate work to optimize user experience. The property_changed attribute may allow users to designate which properties of a given property users would like to listen to and how these users would like to receive changes.

The property_changed attribute may specify a thread type. The thread type may be used to determine what type of thread the method will be fired on if a property changes. This may be useful for either safely handing changes off the main GUI thread or for hopping on to the main GUI thread. For interactable elements, the thread type value may default to the main GUI thread. For element components, this value may default to being off the main GUI thread. The GUI thread may run several times per second checking for all property changes. In a given time interval, a property change may be considered only once. Background threads are guaranteed to not be the main GUI thread to minimize any impact on the user's desktop, VR, or AR experience. By default, these process at a particular time interval to not allow plugins to overrun the CPU.

A user may register to listen to one or more properties for a given method. The user may designate multiple properties if required. In some instances, the property_changed attribute can be applied to a method with no parameters or methods taking a target object and property_changed_event_args. The property_changed_event_args may be filled with information of the given property that instigates the change. The argument version may be used when event_handling is set to "fire_all." The initial_event_attachment and event_handling arguments may be optional, with default values set to "fire_once." A value set to "none" means that this will not fire the event, such as to suppress events from being fired immediately on initialization. A value set to "fire_once" will result in the event being fired once even if multiple designated properties have changed during a time interval. A value set to "fire_all" may result in events being fired for each individual property that is designated if it has changed.

Figure 14:
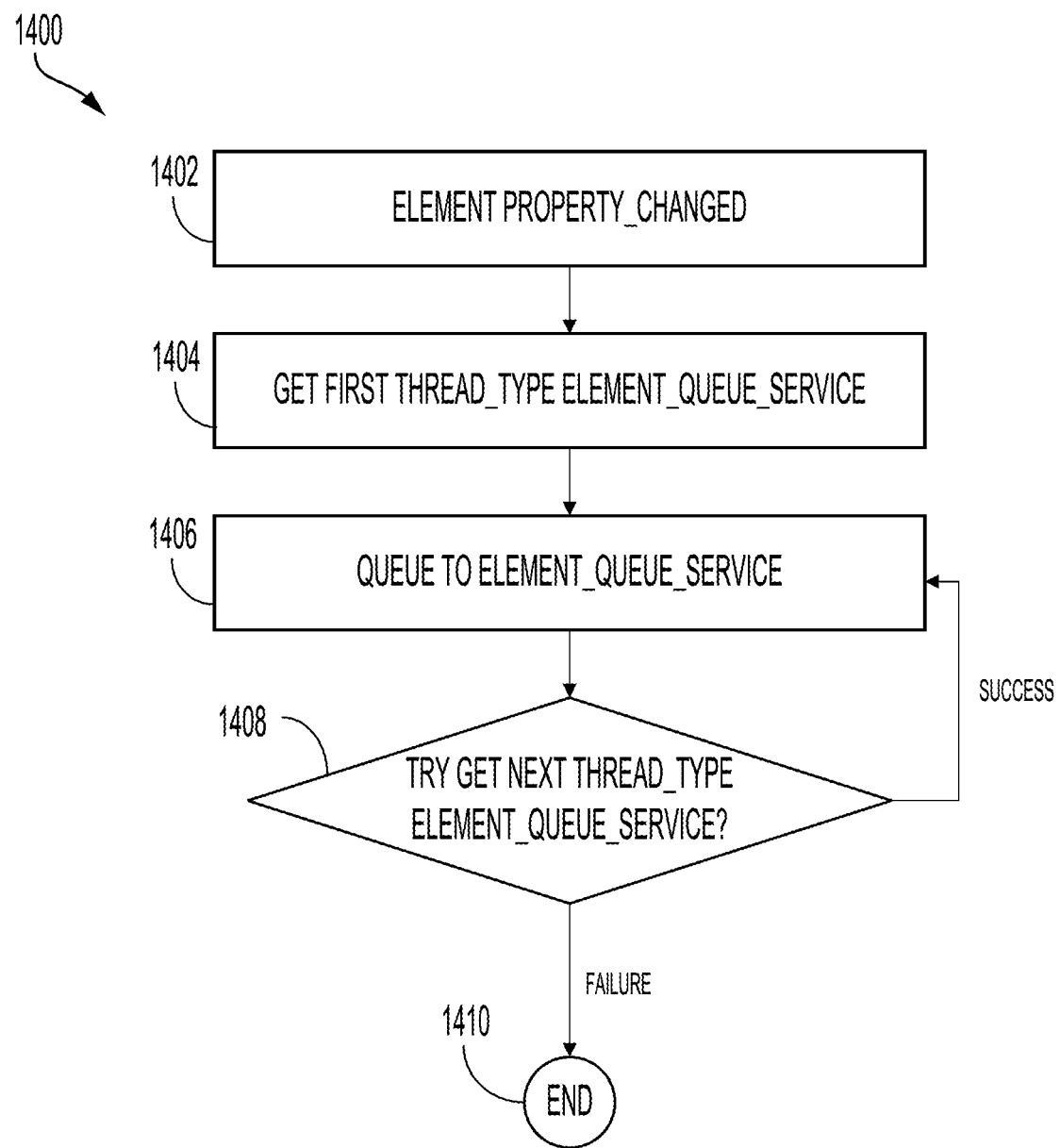
FIG. 14 shows an illustrative example of a process for sifting through components of an object to find property_changed attribute usages and enqueuing element for an element_queue_service in accordance with at least one embodiment.

FIG. 14 shows an illustrative example of a process 1400 for sifting through components of an object to find property_changed attribute usages and enqueuing element for an element_queue_service in accordance with at least one embodiment. The process 1400 may be performed by an element event handler, which may be an internal object that is maintained for every component. When an element property_changed is detected at step 1402, the element event handler gets, at step 1404, the first thread_type element_queue_service. Further, the element event handler may queue an object including itself, the sender information, and the property that changed to the element_queue_service at step 1406. Subsequently, the element event handler may, at step 1408, try to get the next thread_type element_queue_service. If successful, the element event handler may perform step 1406 for this next thread_type. However, if it is unsuccessful, the process 1400 ends at step 1410.

Figure 15:
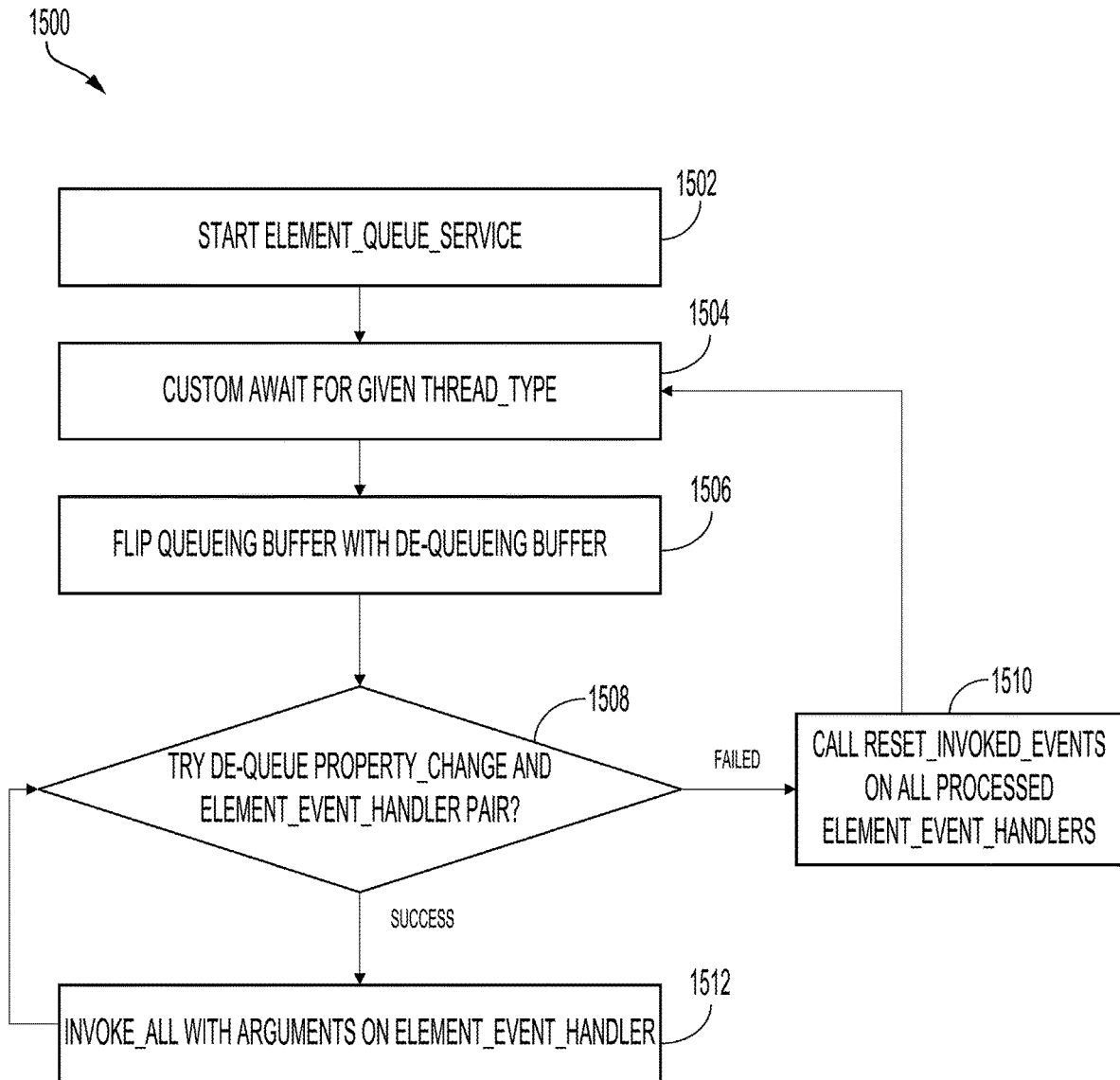
FIG. 15 shows an illustrative example of a process for aggregating and firing property changes at a designated tick on a correct thread according to at least one embodiment.

FIG. 15 shows an illustrative example of a process 1500 for aggregating and firing property changes at a designated tick on a correct thread according to at least one embodiment. The process 1500 may be performed by an element event handler queue service, which may handle aggregating and firing of property changes at designated time intervals on the correct thread. At step 1502, the element event handler queue service may be started. At step 1504, the element event handler queue service may perform a custom await for a given thread_type. Further, at step 1506, the element event handler queue service may flip the queueing buffer with the de-queueing buffer. For instance, the element event handler queue service may utilize a double buffer, whereby the service may enqueuer data to one buffer and later swap to dequeuer all changes on that buffer on the designated time interval.

At step 1508, the element event handler queue service tries to de-queue the property_change and element_event_handler pair. If this is unsuccessful, the element event handler queue service may, at step 1510, call reset_invoked_events on all processed element_event_handlers and perform step 1504. However, if the de-queue process is successful, the element event handler queue service may invoke_all with arguments on element_event_handler at step 1512. For instance, as the element event handler queue service de-queues changes, the element event handler queue service fires calls back into the original element_event_handler. The element_event_handler may track which methods it already fired and may no longer fire designated more than their element_handling rules. Once all events are fired for a given time interval, the element event handler queue service iterates through all called element_event_handlers and resets their tracking of fired methods so that they may be fired on the next time interval.

Figure 16:
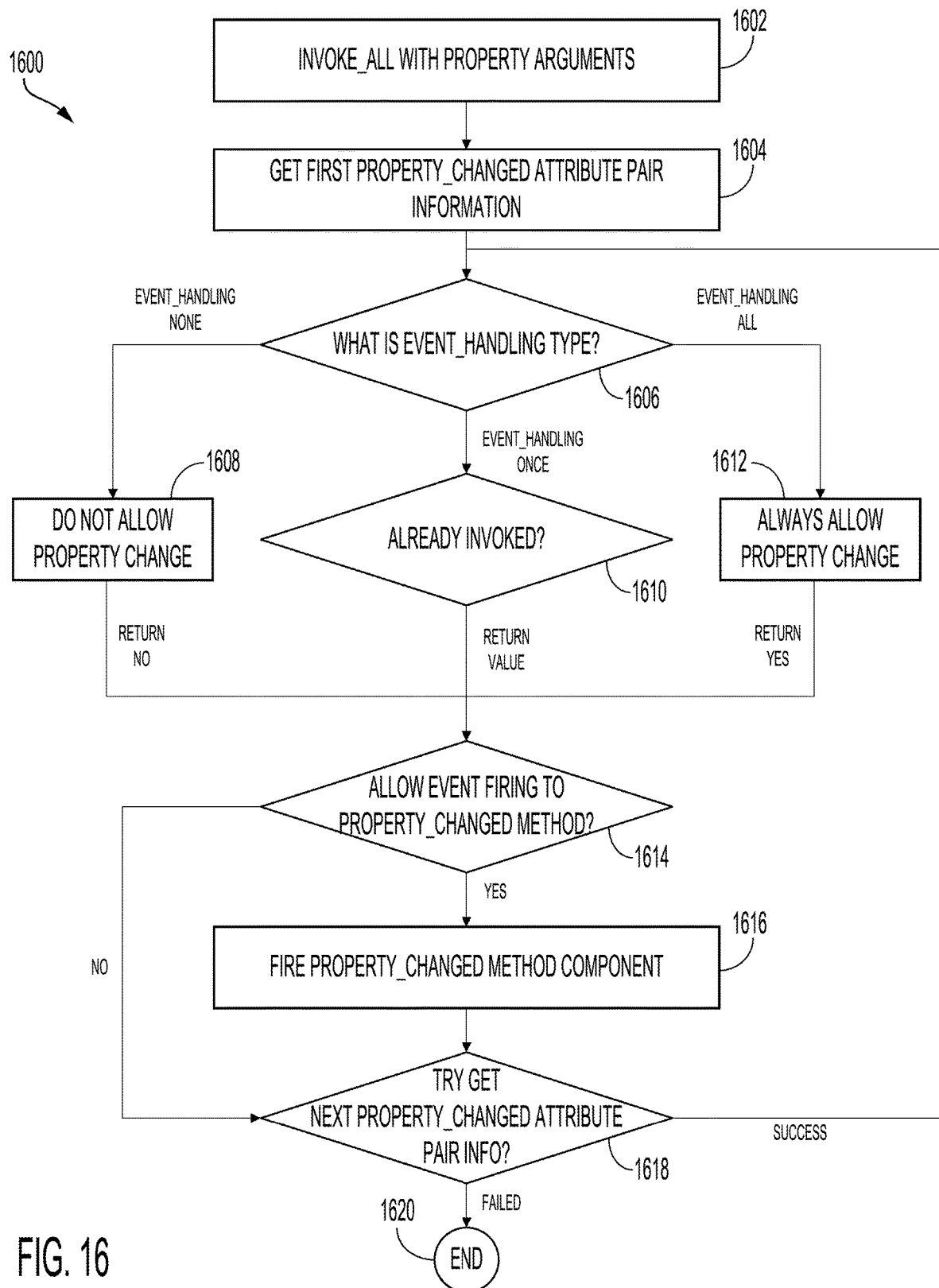
FIG. 16 shows an illustrative example of a process for iterating through all property_changed attributes associated with a particular property name in accordance with at least one embodiment.

FIG. 16 shows an illustrative example of a process 1600 for iterating through all property_changed attributes associated with a particular property name in accordance with at least one embodiment. The process 1600 may be initiated by performing invoke_all with property arguments at step 1602. Subsequently, at step 1604, the first property_changed attribute pair information if obtained. From this pair, at step 1606, it is determined what event_handling type is designated for the pair. If the event_handling type is set to "none," the property change is denied at step 1608 and a "no" response is provided. Alternatively, if the event_handling type is set to "fire_all," the property change is always allowed at step 1612 and a "yes" response is provided. However, if the event_handling type is set to "fire_once," it is determined, at step 1610, whether the property change has already been invoked and, based on this determination, a value is returned.

Based on the returned value, it is determined whether to allow event firing to a property_changed method at step 1614. If so, the property_changed method component is fired at step 1616. The event that is fired is then stored to check for future checks at step 1610. Once the property_changed method component has been fired, an attempt is made, at step 1618, to try and get the next property_changed attribute pair information. If this attempt is successful, the process 1600 cycles back to step 1606, whereby the event_handling type for this pair is determined. However, if this attempt fails, the process 1600 ends at step 1620.

Figure 17:
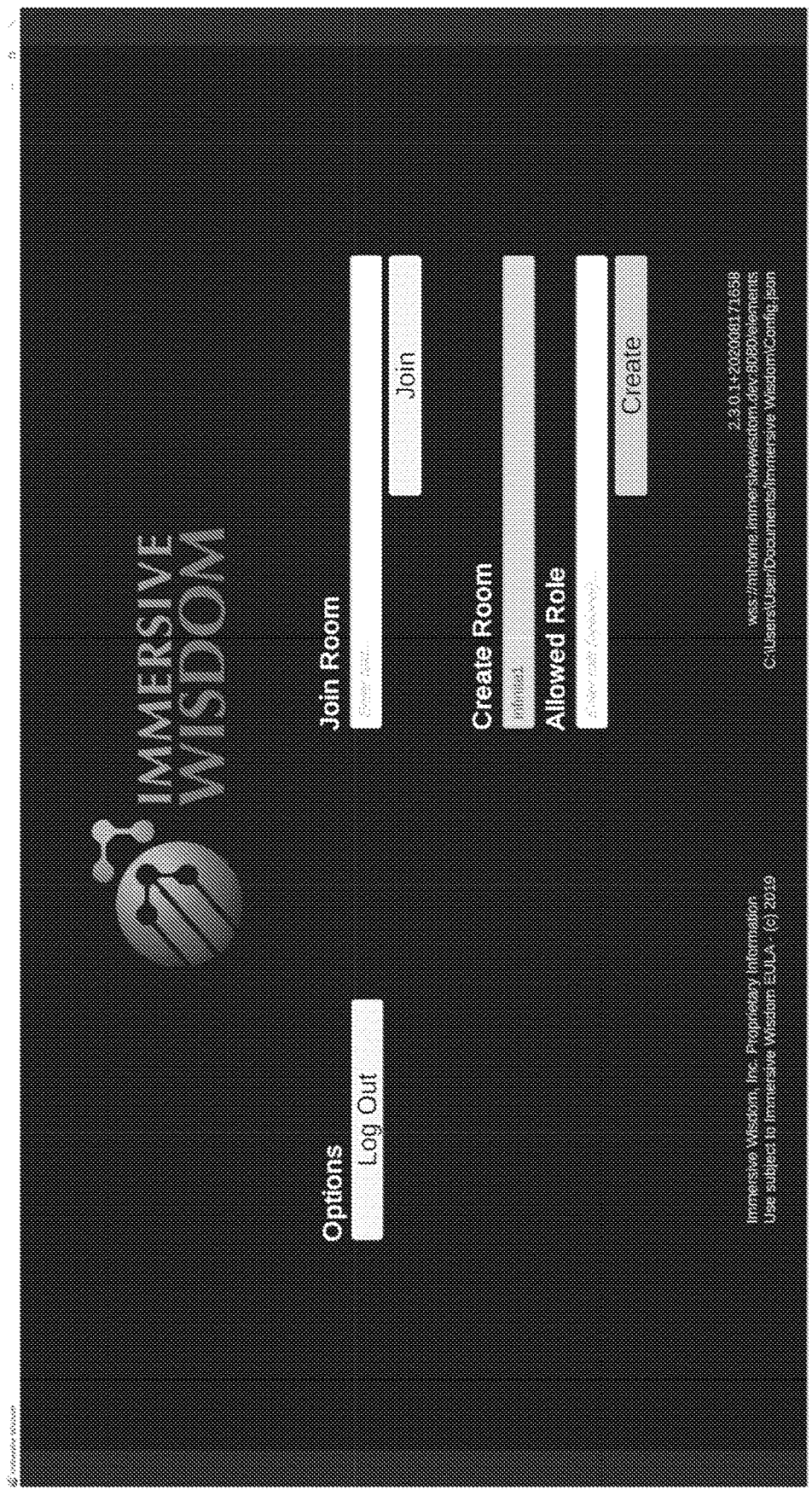
FIG. 17 shows an illustrative example of an interface through which a user can join an existing virtual three-dimensional room or create a new virtual three-dimensional room in accordance with at least one embodiment.

FIG. 17 shows an illustrative example of an interface 1700 through which a user can join an existing virtual three-dimensional room or create a new virtual three-dimensional room in accordance with at least one embodiment. Through the interface 1700, a user may provide the name of an existing virtual three-dimensional room that the user wishes to join. For instance, the user may wish to reconnect to the existing virtual three-dimensional room after a disconnect event. Alternatively, the user may wish to join an existing virtual three-dimensional room created by another user to collaborate with the user.

The interface 1700 may further provide a user with an option to create a new virtual three-dimensional room and optionally define the allowed roles for this room. The user may select a name for the new virtual three-dimensional room, which the filter server may evaluate to determine whether this name is currently being used by another virtual three-dimensional room. If so, the filter server may update the interface 1700 to indicate that the name is not available. This may prompt the user to provide a different name. Once the user has opted to either join an existing virtual three-dimensional room or create a new virtual three-dimensional room, the collaborative virtual environment service may perform the operations described above in connection with FIGS. 3 and 4 to allow the user to access the virtual three-dimensional room and access any elements (subject to a set of permissions) within the virtual three-dimensional room.

Figure 18:
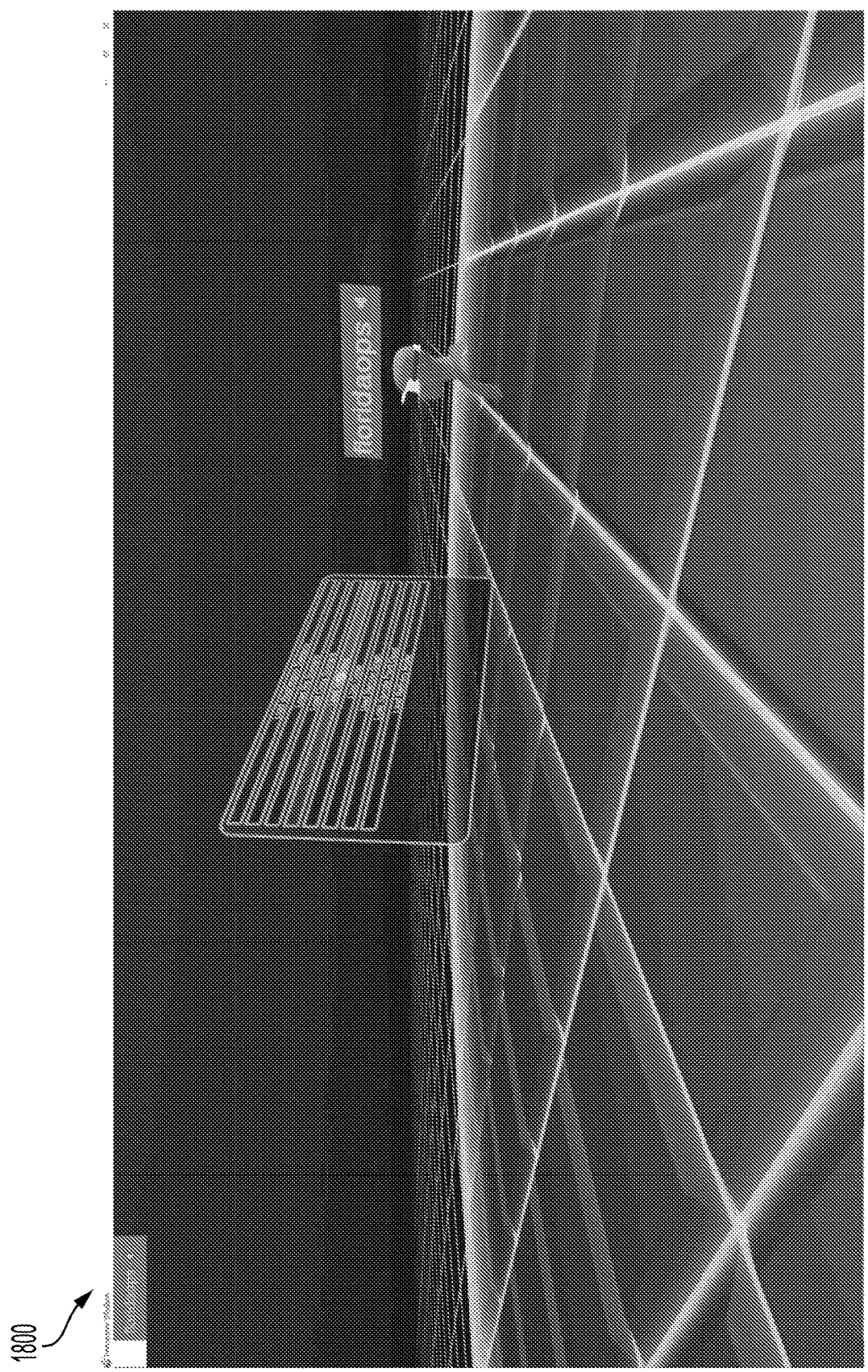
FIG. 18 shows an illustrative example of an interface through which a user in a virtual three-dimensional room is presented with a panel element invoked by another user in the virtual three-dimensional room and with an avatar of the other user in accordance with at least one embodiment.

FIG. 18 shows an illustrative example of an interface 1800 through which a user in a virtual three-dimensional room is presented with a panel element invoked by another user in the virtual three-dimensional room and with an avatar of the other user in accordance with at least one embodiment. In the environment 1800, a user may be within the boundaries of a virtual three-dimensional room that includes another user and one or more elements that the user may interact with. For example, as illustrated in FIG. 18, the other user may have loaded a panel element into the virtual three-dimensional room. Through the panel, the other user may select one or more plugins and/or elements that may be loaded into the virtual three-dimensional room. The panel element may be placed within the room from the perspective of the other user such that the panel element is spatially oriented at an angle from the user's perspective.

In an embodiment, the user and the other user within the virtual three-dimensional room can simultaneously interact with the panel element. For instance, while the other user is interacting with the panel element to select a plugin and/or element that is to be loaded into the virtual three-dimensional room, the user may also simultaneously interact with the panel element (e.g., move the panel element within the room, select plugins and/or elements from the panel element, resize the panel element, etc.). This may allow the users to work collaboratively within the virtual three-dimensional room in real time.

In an embodiment, the panel element can be subject to one or more policies, whereby only users granted permission to interact with the panel element may be able to do so. The different permission models are described in greater detail above in connection with FIGS. 6A-6C. For instance, if the panel element is subject to a policy whereby only users assigned a role of "Manager" can read the panel element, users that are not assigned this role are unable to read, write, or share the panel element. Thus, while a user with the "Manager" role may readily interact with the panel element, a user without this role may not be able to see the panel element within the virtual three-dimensional room or otherwise be able to read any of the features of the panel element.

In an embodiment, a user's spatial vicinity can be graphically represented within the virtual three-dimensional room so that the user may readily identify its spatial vicinity and determine which elements are available within its spatial vicinity. For example, as illustrated in FIG. 18, the user's spatial vicinity may be represented by a highlighted radial area extending from the user's position within the virtual three-dimensional room to an outer limit. In some instances, the user may configure the size of its spatial vicinity. The spatial vicinity may be used to define which interactable elements are to be loaded on to the user's client at a given time. This may allow for dynamic, realtime management of DOM visual resources.

As an illustrative example of the use of the user's spatial vicinity, the panel element illustrated in FIG. 18 may be loaded on to the user's client as a result of the panel element being within the spatial vicinity and field of view of the user. However, had the panel element been loaded into the virtual three-dimensional room at a location outside of the user's spatial vicinity and field of view, the panel element may not have been loaded on to the user's client. If the user were to move within the virtual three-dimensional room such that its spatial vicinity or field of view encompassed the panel element, the panel element at this time would be loaded on to the user's client and presented to the user via the interface 1800.

Figure 19:
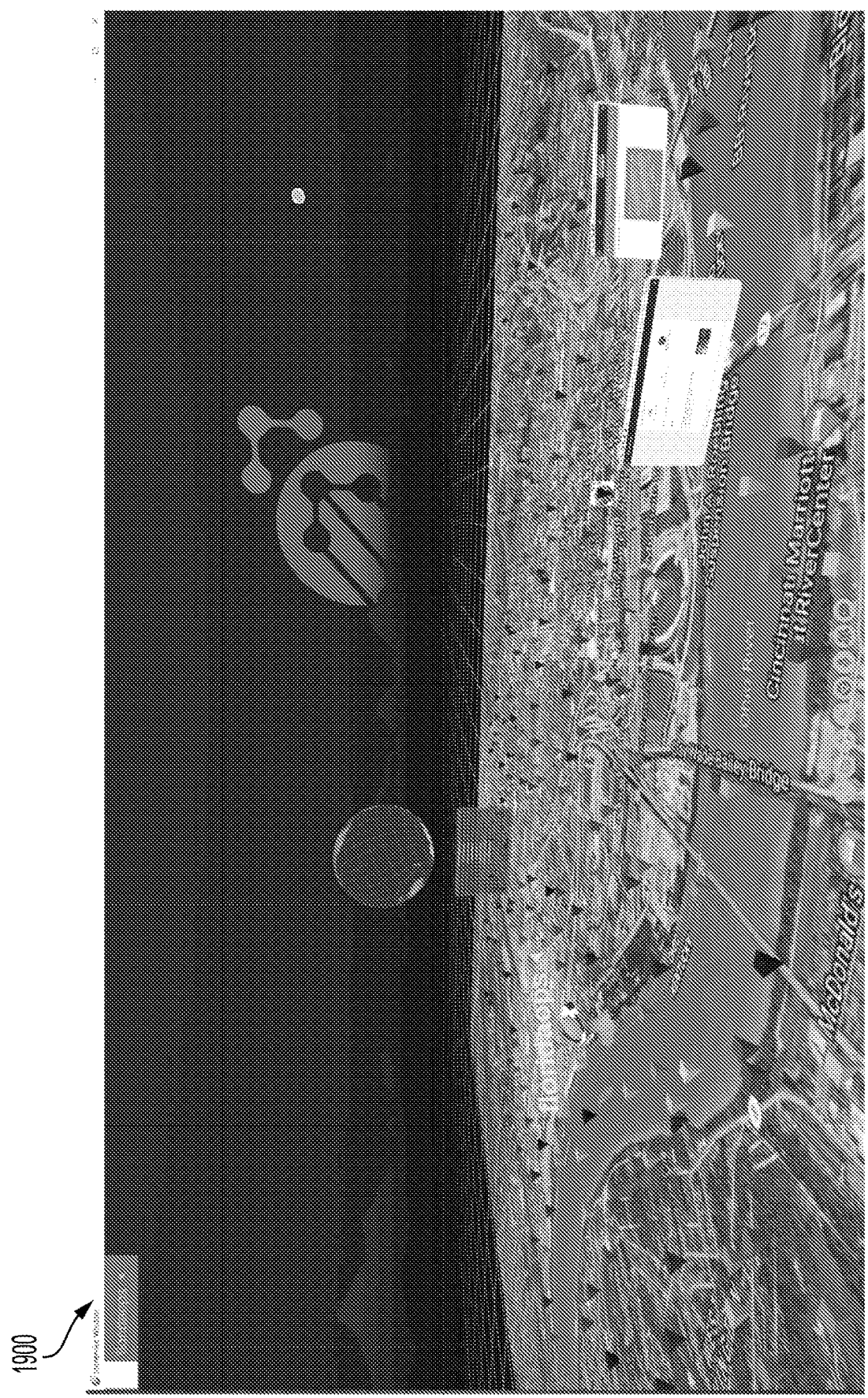
FIG. 19 shows an illustrative example of an interface through which a user in a virtual three-dimensional room is presented with various interactive elements and avatars of other users present within the room in accordance with at least one embodiment.

FIG. 19 shows an illustrative example of an interface 1900 through which a user in a virtual three-dimensional room is presented with various interactive elements and avatars of other users present within the room in accordance with at least one embodiment. In the environment 1900, a user may be present within a virtual three-dimensional room within its virtual three-dimensional environment. This virtual three-dimensional room may include various interactable elements, such as a two-dimensional map, a three-dimensional globe, several panel elements, and several markers positioned on the two-dimensional map.

As noted above, a virtual three-dimensional room may be represented using a hierarchical tree structure, whereby the room serves as a root node in the tree and other interactable elements may be hierarchically placed within the tree structure as children of the root node. Permissions may be defined for each of the elements (nodes) of the hierarchical tree for the room. For instance, the virtual three-dimensional room may be subject to no permissions (e.g., anyone can access the room and perform operations within the room) whereas the two-dimensional map, globe element, panel element, marker, etc. may be subject to one or more permissions as defined by an administrator, owner, or other authorized entity for the particular element. As noted above, permissions may be inherited from a parent node. For instance, if access to a marker is restricted to users being assigned the role of "Manager," any elements stemming from interaction with the marker (e.g., a panel, a dataset, etc.) are also made subject to this restriction, regardless of whether the restriction is explicitly defined for these child elements or not.

In an embodiment, the fidelity (e.g., resolution, display quality, etc.) of an element presented within the virtual three-dimensional room for a particular user may be determined based on the user's spatial proximity to the element. For instance, as illustrated in FIG. 19, while the two-dimensional map may be loaded for the user as a result of the map being within the user's spatial vicinity and field of view, portions of the map that are further away from the user may be loaded with lower fidelity in order to reduce the amount of resources required to present the two-dimensional map to the user within the virtual three-dimensional environment. As the user moves within the virtual three-dimensional room, features of the two-dimensional map originally loaded with lower fidelity may be updated to provide higher fidelity as the user draws closer to these features.

In an embodiment, the visibility of an element and/or the data associated with the element that is presented within the virtual three-dimensional room can be determined based on the user's spatial proximity to the element. For example, as the user moves towards an element within the virtual three-dimensional room, the visibility of the element may increase such that the element may become more visible to the user. This may allow the user to better interact with elements as the user moves closer to the element within the virtual three-dimensional room. Further, in some instances, as the user moves towards an element within the virtual three-dimensional room, the data presented in association with the element may change. For example, as the user moves towards an element within the virtual three-dimensional room, the amount and/or types of data associated with the element and presented to the user within the virtual three-dimensional room may dynamically change.

In an embodiment, as a user moves within the virtual three-dimensional room, elements that enter within spatial proximity (e.g., within a particular radius and/or within the user's field of view) of the user are loaded with greater granularity. For example, any elements that are within a radial distance and/or within a field of view of the user within the virtual three-dimensional room may be loaded, whereas any elements that are outside of this radial distance and/or of the user's field of view may be presented with lower fidelity, less data, less visibility, and the like. Alternatively, any elements that are no longer within spatial proximity of the user may be removed from memory and, thus, may no longer consumer any of the user's client resources. Thus, as the user moves through the virtual three-dimensional room, the presentation of different elements within the virtual three-dimensional room may be dynamically changed in real time based on the position of these elements with relation to the user's location within the virtual three-dimensional room and the distance from the user's location to each of these elements.

The dynamic and real time changes to the presentation of different elements within the virtual three-dimensional room may reduce the overall CPU load, memory load, network bandwidth usage, and other resource usage for the user's client device. For example, as the user moves within the virtual three-dimensional room, only the elements within the user's spatial proximity and/or field of view may be loaded on to the user's client device, whereby the granularity of these elements may differ as a function of the user's distance to these elements. Any elements that are no longer within the user's spatial proximity and/or field of view may be unloaded such that these elements consume fewer or no resources of the client's device.

In an embodiment, the presentation of different elements within the virtual three-dimensional room can be dynamically changed in real time based on the user's network quality of service (QOS) and/or other performance characteristics of the user's client device (e.g., CPU load, memory load, etc.). For instance, a filter server (e.g., filter server 206 described above in connection with FIG. 2) may monitor, in real time, the network QoS and other performance characteristics of the user's client device as the user moves within the virtual three-dimensional room and interacts with one or more elements within the virtual three-dimensional room. This monitoring may be performed using a load-on-demand (LOD) process that may be configurable per client device (e.g., user) based on the performance characteristics of the client device.

If the filter server detects a degradation in the performance of the user's client device (e.g., a drop in the network QoS, a spike in resource utilization of the user's client device, etc.), the filter server may dynamically, and in real time, adjust the presentation of the different elements within the virtual three-dimensional room such that the user may continue to interact with these elements without experiencing any lag or other detrimental impact to the user's ability to interact with these elements and with the virtual three-dimensional room. For example, the granularity of elements within the user's spatial proximity and/or field of view within the virtual three-dimensional room may be dynamically adjusted based on the performance of the user's client device. In some examples, the filter server can additionally, or alternatively, dynamically adjust the user's radial distance and/or field of view such that the user may need to be closer to an element within the virtual three-dimensional room in order for the element to be presented with greater granularity or fidelity.

In an embodiment, a user can manually determine how presentation of different elements within the virtual three-dimensional room is to be changed in the event of degradation of performance of the user's client device as the user moves within the virtual three-dimensional room and interacts with different elements within the virtual three-dimensional room. For example, a user may manually manage the virtual three-dimensional room hierarchy to better serve its purposes. As noted above, an interactable element may be hierarchical in structure, where the interactable element may hold, at its root, a room element corresponding to the virtual three-dimensional room. This room element may include collections of user elements and container elements. A container element may serve as the core data binding for internal and external data that is represented in the virtual three-dimensional room. Thus, the user may manually manage this hierarchy such that different elements are presented subject to the user's requirements.

As noted above, users within the virtual three-dimensional room may simultaneously interact with the various elements within the virtual three-dimensional room and any changes made to these elements may be propagated to the users within the room. For instance, as the user "floridaops" interacts with a panel element and globe, other users within the virtual three-dimensional room may witness these interactions and view any changes made to these elements in real time. Further, users may simultaneously interact with these elements as the user "floridaops" also interacts with these elements.

In some instances, interaction with a particular element within the virtual three-dimensional room may result in the loading of another element. For instance, as illustrated in FIG. 19, when a user interacts with a marker element, a panel element may be loaded into the virtual three-dimensional room. The panel element may include data corresponding to the marker element or otherwise associated with the marker element. The user may interact with the panel element to read, write, and/or share data (subject to any permissions defined for the panel element and underlying data). Further, interactions with the panel element may be propagated to the other users within the room, subject to any permissions established for the various elements of the room.

Figure 20:
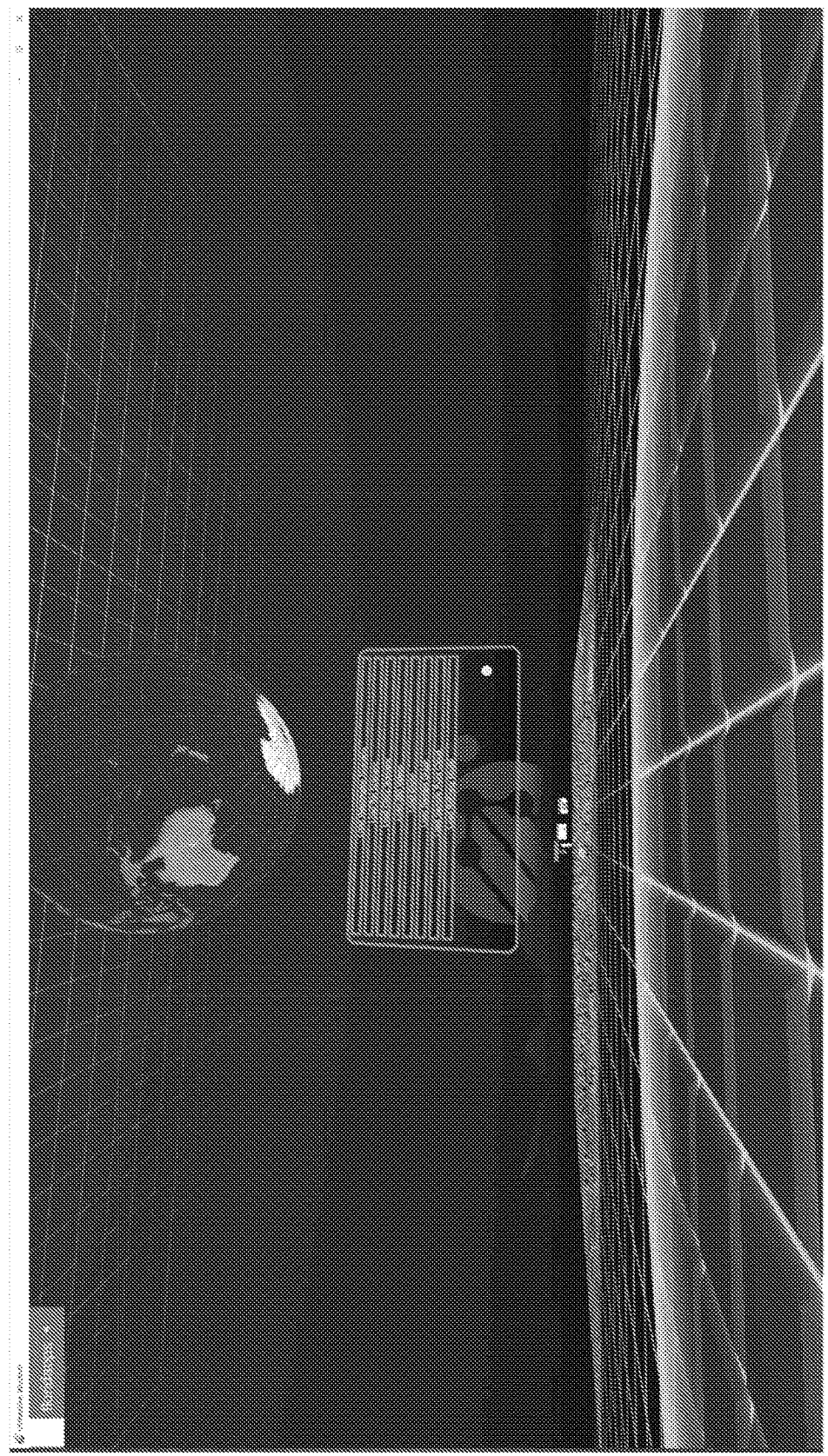
FIG. 20 shows an illustrative example of an interface through which elements outside of a user's field of view or spatial location are presented with lower fidelity compared to other elements within the user's field of view or spatial location in accordance with at least one embodiment.

FIG. 20 shows an illustrative example of an interface 2000 through which elements outside of a user's field of view or spatial location are presented with lower fidelity compared to other elements within the user's field of view or spatial location in accordance with at least one embodiment. As noted above, a user's spatial vicinity and field of view within a virtual three-dimensional environment may be used to determine what elements are loaded on to the user's client. A user's spatial vicinity, as illustrated in FIG. 20 and described above in connection with FIG. 5, may be represented by a highlighted radial area extending from the user's position within the virtual three-dimensional environment to a pre-defined outer limit. In some instances, the user may configure the size of its spatial vicinity. The spatial vicinity may be used to define which interactable elements are to be loaded on to the user's client at a given time. This may allow for dynamic, realtime management of DOM visual resources.

As illustrated in FIG. 20, a map including various markers and other elements may be present within a virtual three-dimensional room that the user is a member of. The map and its corresponding elements, while within the field of view of the user, may be outside of the user's spatial vicinity. As a result, the map may be loaded on to the user's client at a low fidelity, whereby features of the map and its corresponding elements may be presented at a low resolution. However, elements that are within the user's spatial vicinity and field of view (e.g., the globe element and panel element, as illustrated in FIG. 20) may be presented at a higher fidelity, whereby the various features of these elements may be loaded on to the user's client and presented to the user within the virtual three-dimensional environment. This is further described above in connection with FIG. 5.

If the user moves within its virtual three-dimensional environment towards the map and its corresponding elements, the user's client may obtain from the collaborative virtual environment service additional features of these elements and load these on to the user's virtual three-dimensional environment. This may allow the user to readily view additional details and features of these elements as it draws closer to them, thus changing the user's perspective in real time.

Figure 21:
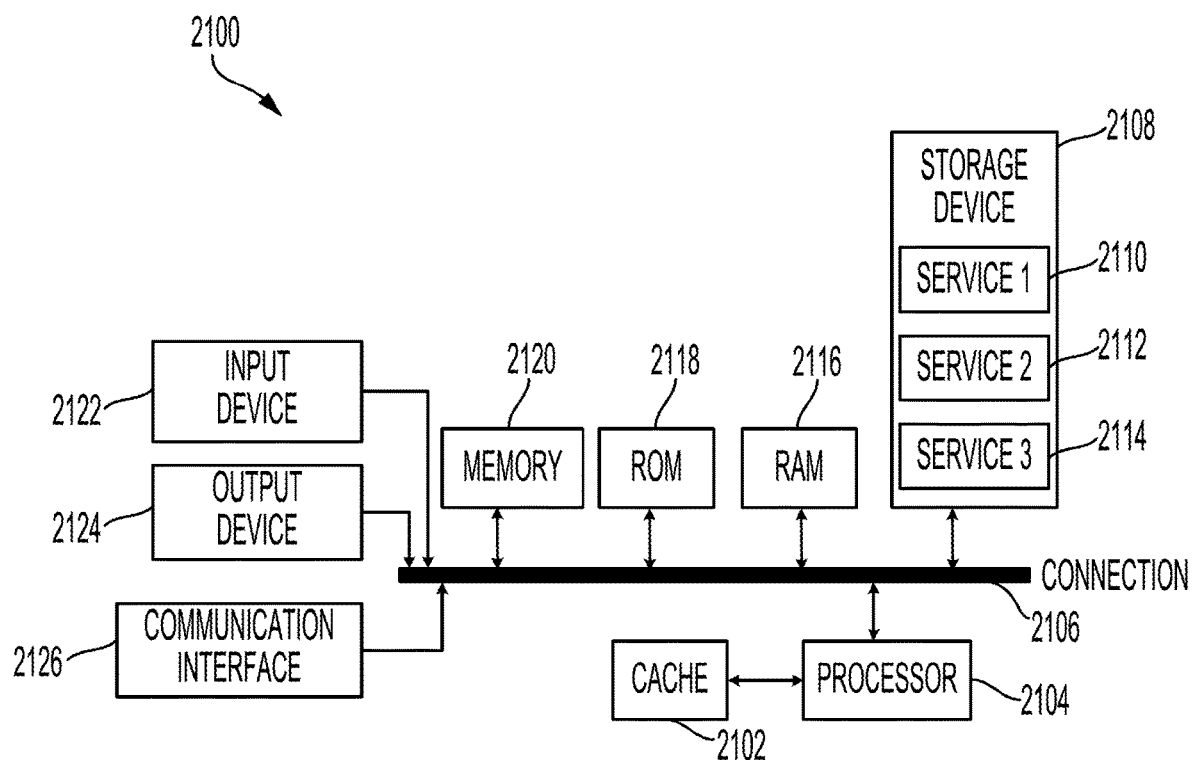
FIG. 21 shows an illustrative example of an environment in which various embodiments can be implemented.

FIG. 21 illustrates a computing system architecture 2100 including various components in electrical communication with each other using a connection 2106, such as a bus, in accordance with some implementations. Example system architecture 2100 includes a processing unit (CPU or processor) 2104 and a system connection 2106 that couples various system components including the system memory 2120, such as ROM 2118 and RAM 2116, to the processor

2104. The system architecture 2100 can include a cache 2102 of high-speed memory connected directly with, in close proximity to, or integrated as part of the processor 2104. The system architecture 2100 can copy data from the memory 2120 and/or the storage device 2108 to the cache 2102 for quick access by the processor 2104. In this way, the cache can provide a performance boost that avoids processor 2104 delays while waiting for data. These and other modules can control or be configured to control the processor 2104 to perform various actions.

Other system memory 2120 may be available for use as well. The memory 2120 can include multiple different types of memory with different performance characteristics. The processor 2104 can include any general purpose processor and a hardware or software service, such as service 1 2110, service 2 2112, and service 3 2114 stored in storage device 2108, configured to control the processor 2104 as well as a special-purpose processor where software instructions are incorporated into the actual processor design. The processor 2104 may be a completely self-contained computing system, containing multiple cores or processors, a bus, memory controller, cache, etc. A multi-core processor may be symmetric or asymmetric.

To enable user interaction with the computing system architecture 2100, an input device 2122 can represent any number of input mechanisms, such as a microphone for speech, a touch-sensitive screen for gesture or graphical input, keyboard, mouse, motion input, speech and so forth. An output device 2124 can also be one or more of a number of output mechanisms known to those of skill in the art. In some instances, multimodal systems can enable a user to provide multiple types of input to communicate with the computing system architecture 2100. The communications interface 2126 can generally govern and manage the user input and system output. There is no restriction on operating on any particular hardware arrangement and therefore the basic features here may easily be substituted for improved hardware or firmware arrangements as they are developed.

Storage device 2108 is a non-volatile memory and can be a hard disk or other types of computer readable media which can store data that are accessible by a computer, such as magnetic cassettes, flash memory cards, solid state memory devices, digital versatile disks, cartridges, RAMs 2116, ROM 2118, and hybrids thereof.

The storage device 2108 can include services 2110, 2112, 2114 for controlling the processor 2104. Other hardware or software modules are contemplated. The storage device 2108 can be connected to the system connection 2106. In one aspect, a hardware module that performs a particular function can include the software component stored in a computer-readable medium in connection with the necessary hardware components, such as the processor 2104, connection 2106, output device 2124, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
    detecting a plugin request to implement a change to a property associated with an interactable element within a virtual three-dimensional room implemented using a hierarchical component-based model-view-viewmodel (MVVM) decentralized application, wherein the virtual three-dimensional room is created using a real time stream processor (RSP) that automatically executes one or more plugins;
    obtaining a property specific lock associated with the property, wherein the property specific lock guarantees that a single entity can change the property at a given time;
    updating a property value corresponding to the property, wherein the property value is updated according to the change indicated in the plugin request;
    releasing the property specific lock; and
    propagating in real time the change to devices corresponding to other users within the virtual three-dimensional room, wherein when the change is propagated to the devices, the change is displayed in real time.

2. The computer-implemented method of claim 1, further comprising:
    identifying a new property value for the interactable element, wherein the new property value is identified from the change indicated in the plugin request; and
    evaluating the new property value against a current property value for the interactable element, wherein the property value is updated as a result of the new property value differing from the current property value.

3. The computer-implemented method of claim 1, wherein the change is propagated to the devices as a result of the property value being updated according to a sensitivity to property changes to the interactable element, and wherein the sensitivity is determined based on a context of the property.

4. The computer-implemented method of claim 1, further comprising:
    determining that the interactable element is a chained element associated with an original parent claim, wherein the original parent claim is associated with a parent interactable element chained to the interactable element; and
    attaching a new parent claim to the interactable element, wherein attaching the new parent claim includes removing the original parent claim.

5. The computer-implemented method of claim 1, further comprising:
    determining that access to the interactable element is restricted to users assigned to a role, wherein the change is propagated to the devices corresponding to the other users as a result of the other users being assigned to the role.

6. The computer-implemented method of claim 1, wherein the virtual three-dimensional room is accessible using virtual reality systems, augmented reality systems, and desktop systems.

7. A system, comprising:
    one or more processors; and
    memory storing thereon instructions that, as a result of being executed by the one or more processors, cause the system to:
        detect a plugin request to implement a change to a property associated with an interactable element within a virtual three-dimensional room implemented using a hierarchical component-based model-view-viewmodel (MVVM) decentralized application, wherein the virtual three-dimensional room is created using a real time stream processor (RSP) that automatically executes one or more plugins;
        obtain a property specific lock associated with the property, wherein the property specific lock guarantees that a single entity can change the property at a given time;
        update a property value corresponding to the property, wherein the property value is updated according to the change indicated in the plugin request;
        release the property specific lock; and
        propagate in real time the change to devices corresponding to other users within the virtual three-dimensional room, wherein when the change is propagated to the devices, the change is displayed in real time.

8. The system of claim 7, wherein the instructions further cause the system to:
    identify a new property value for the interactable element, wherein the new property value is identified from the change indicated in the plugin request; and
    evaluate the new property value against a current property value for the interactable element, wherein the property value is updated as a result of the new property value differing from the current property value.

9. The system of claim 7, wherein the change is propagated to the devices as a result of the property value being updated according to a sensitivity to property changes to the interactable element, and wherein the sensitivity is determined based on a context of the property.

10. The system of claim 7, wherein the instructions further cause the system to:
    determine that the interactable element is a chained element associated with an original parent claim, wherein the original parent claim is associated with a parent interactable element chained to the interactable element; and
    attach a new parent claim to the interactable element, wherein attaching the new parent claim includes removing the original parent claim.

11. The system of claim 7, wherein the instructions further cause the system to:
    determine that access to the interactable element is restricted to users assigned to a role, wherein the change is propagated to the devices corresponding to the other users as a result of the other users being assigned to the role.

12. The system of claim 7, wherein the virtual three-dimensional room is accessible using virtual reality systems, augmented reality systems, and desktop systems.

13. A non-transitory, computer-readable storage medium storing thereon executable instructions that, as a result of being executed by one or more processors of a computer system, cause the computer system to:
    detect a plugin request to implement a change to a property associated with an interactable element within a virtual three-dimensional room implemented using a hierarchical component-based model-view-viewmodel (MVVM) decentralized application, wherein the virtual three-dimensional room is created using a real time stream processor (RSP) that automatically executes one or more plugins;
    obtain a property specific lock associated with the property, wherein the property specific lock guarantees that a single entity can change the property at a given time;
    update a property value corresponding to the property, wherein the property value is updated according to the change indicated in the plugin request;
    release the property specific lock; and
    propagate in real time the change to devices corresponding to other users within the virtual three-dimensional room, wherein when the change is propagated to the devices, the change is displayed in real time.

14. The non-transitory, computer-readable storage medium of claim 13, wherein the executable instructions further cause the computer system to:
    identify a new property value for the interactable element, wherein the new property value is identified from the change indicated in the plugin request; and
    evaluate the new property value against a current property value for the interactable element, wherein the property value is updated as a result of the new property value differing from the current property value.

15. The non-transitory, computer-readable storage medium of claim 13, wherein the change is propagated to the devices as a result of the property value being updated according to a sensitivity to property changes to the interactable element, and wherein the sensitivity is determined based on a context of the property.

16. The non-transitory, computer-readable storage medium of claim 13, wherein the executable instructions further cause the computer system to:
    determine that the interactable element is a chained element associated with an original parent claim, wherein the original parent claim is associated with a parent interactable element chained to the interactable element; and attach a new parent claim to the interactable element, wherein attaching the new parent claim includes removing the original parent claim.

17. The non-transitory, computer-readable storage medium of claim 13, wherein the executable instructions further cause the computer system to:

determine that access to the interactable element is restricted to users assigned to a role, wherein the change is propagated to the devices corresponding to the other users as a result of the other users being assigned to the role.

18. The non-transitory, computer-readable storage medium of claim 13, wherein the virtual three-dimensional room is accessible using virtual reality systems, augmented reality systems, and desktop systems.

* * * * *